United States Patent
Maeda

(10) Patent No.: US 9,415,767 B2
(45) Date of Patent: Aug. 16, 2016

(54) TRAVEL CONTROL DEVICE OF HYBRID VEHICLE

(71) Applicant: TOYOTA JIDOSHA KABUSHIKI KAISHA, Toyota-shi, Aichi-ken (JP)

(72) Inventor: Eiji Maeda, Fuji (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/765,874

(22) PCT Filed: Feb. 7, 2013

(86) PCT No.: PCT/JP2013/052929
§ 371 (c)(1),
(2) Date: Aug. 5, 2015

(87) PCT Pub. No.: WO2014/122761
PCT Pub. Date: Aug. 14, 2014

(65) Prior Publication Data
US 2015/0367833 A1    Dec. 24, 2015

(51) Int. Cl.
*B60W 10/06*    (2006.01)
*B60K 6/445*    (2007.10)
(Continued)

(52) U.S. Cl.
CPC ............... *B60W 20/10* (2013.01); *B60K 6/365* (2013.01); *B60K 6/445* (2013.01); *B60K 6/48* (2013.01); *B60K 6/54* (2013.01); *B60K 6/547* (2013.01); *B60W 10/06* (2013.01); *B60W 10/08* (2013.01); *B60W 10/10* (2013.01); *B60W 10/18* (2013.01);
(Continued)

(58) Field of Classification Search
CPC ..... B60W 20/10; B60W 20/00; B60W 10/18; B60W 10/10; B60W 10/08; B60W 10/06; B60K 6/48; B60K 6/54; B60K 6/365; B60K 6/547; B60K 6/455; F16H 3/728; F16H 3/727; Y10S 903/93; Y02T 10/6239
See application file for complete search history.

(56) References Cited

U.S. PATENT DOCUMENTS 4,078,631 A *  3/1978  Kadota ............... B60K 31/105
                                                          123/325
7,220,203 B2   5/2007  Holmes et al.
(Continued)

FOREIGN PATENT DOCUMENTS

JP    2003-104072 A    4/2003
JP    2007-187090 A    7/2007
(Continued)

*Primary Examiner* — Michael J Zanelli
(74) *Attorney, Agent, or Firm* — Kenyon & Kenyon LLP

(57) ABSTRACT

A travel control device is applied to a hybrid vehicle which includes a planetary gear mechanism capable of distributing power of an internal combustion engine to a first MG and an output part, and a second MG capable of outputting power to the output part. The travel control device allows the vehicle to travel in an acceleration-deceleration travel mode in which, when a high-speed steady travel condition is established during travel of the vehicle, acceleration travel for accelerating the vehicle with power output from the internal combustion engine and coasting travel for allowing the vehicle to coast with the internal combustion engine in a stop state are alternately repeated within a target vehicle speed range. In the travel control device, given power is output from the internal combustion engine at the time of acceleration travel, and the internal combustion engine is controlled such that the vehicle is accelerated at an acceleration such that the rotation speed of the first MG becomes zero.

6 Claims, 21 Drawing Sheets

(51) Int. Cl.
*B60K 6/547* (2007.10)
*B60W 10/08* (2006.01)
*B60W 10/10* (2012.01)
*B60W 10/18* (2012.01)
*B60W 20/00* (2016.01)
*B60K 6/365* (2007.10)
*F16H 3/72* (2006.01)
*B60K 6/48* (2007.10)
*B60K 6/54* (2007.10)
*B60W 30/18* (2012.01)
*F16H 37/08* (2006.01)
*F16H 3/66* (2006.01)

(52) U.S. Cl.
CPC ............... *B60W 20/00* (2013.01); *F16H 3/727* (2013.01); *F16H 3/728* (2013.01); *B60W 2030/1809* (2013.01); *B60W 2520/105* (2013.01); *B60W 2710/0677* (2013.01); *B60W 2710/081* (2013.01); *B60W 2710/1005* (2013.01); *F16H 3/66* (2013.01); *F16H 2037/0866* (2013.01); *F16H 2037/0873* (2013.01); *F16H 2200/0043* (2013.01); *F16H 2200/201* (2013.01); *F16H 2200/2005* (2013.01); *F16H 2200/2041* (2013.01); *Y02T 10/6239* (2013.01); *Y10S 903/911* (2013.01); *Y10S 903/917* (2013.01); *Y10S 903/93* (2013.01)

(56) References Cited

U.S. PATENT DOCUMENTS

| | | | |
|---|---|---|---|
| 2003/0064854 | A1 | 4/2003 | Kotani |
| 2003/0078134 | A1* | 4/2003 | Kojima ................ B60K 6/365 477/3 |
| 2008/0029323 | A1* | 2/2008 | Kaya ..................... B60K 6/445 180/174 |
| 2009/0146615 | A1 | 6/2009 | Zillmer et al. |
| 2012/0135839 | A1* | 5/2012 | Watanabe ....... B60W 30/18072 477/110 |

FOREIGN PATENT DOCUMENTS

| | | | |
|---|---|---|---|
| JP | 2010-006309 A | | 1/2010 |
| JP | 2010-280281 A | * | 12/2010 |
| JP | 4991555 B2 | | 8/2012 |

\* cited by examiner

F I G . 1
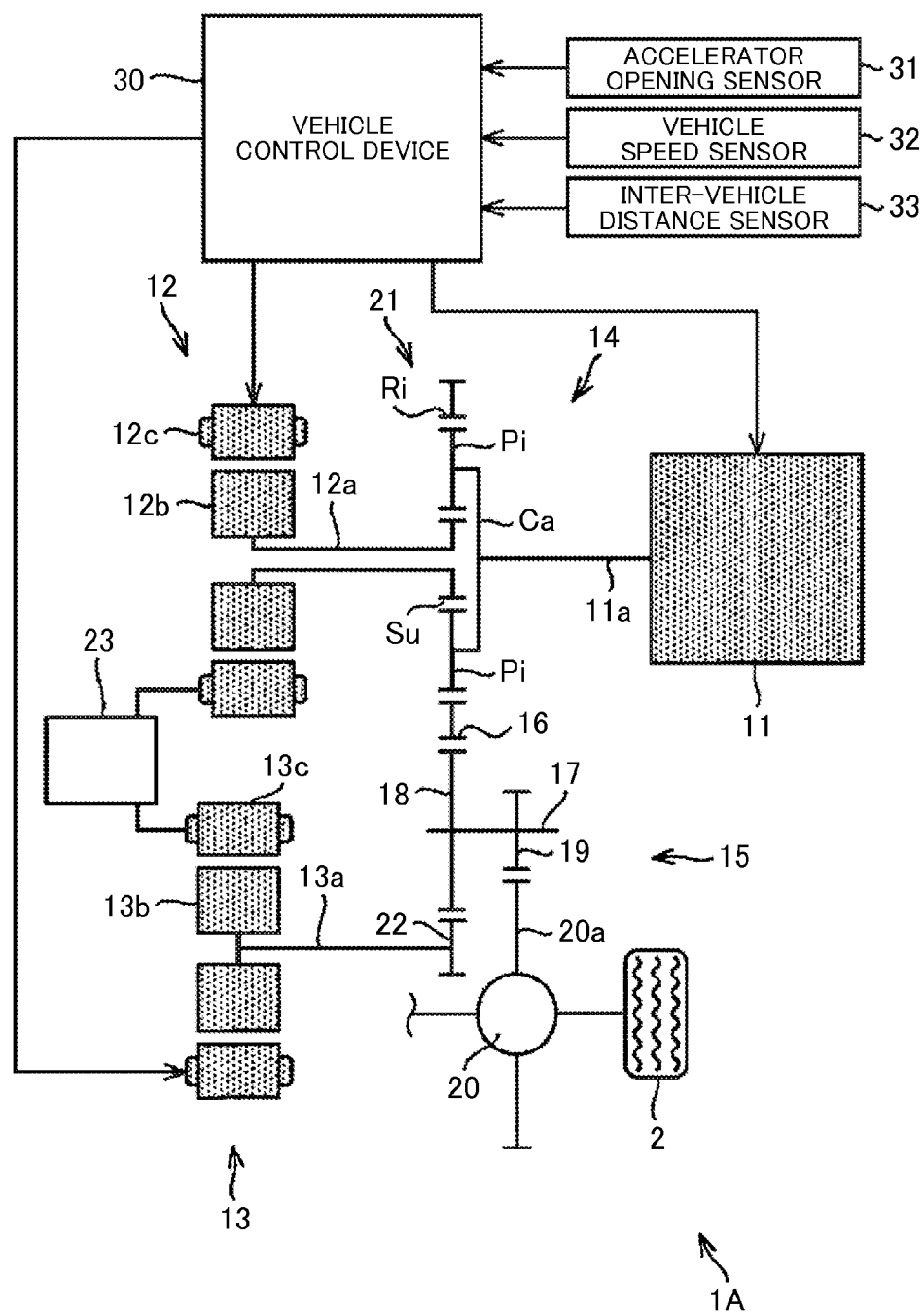

FIG.17

|  | C1 | C2 | B1 | B2 |
|---|---|---|---|---|
| FIRST GEAR SPEED | ○ | × | ○ | × |
| SECOND GEAR SPEED | × | ○ | ○ | × |
| THIRD GEAR SPEED | ○ | ○ | × | × |
| FOURTH GEAR SPEED | × | ○ | × | ○ |

TRAVEL CONTROL DEVICE OF HYBRID VEHICLE

CROSS-REFERENCE TO RELATED APPLICATION

This is a national phase application based on the PCT International Patent Application No. PCT/JP2013/052929 filed Feb. 7, 2013, the entire contents of which are incorporated herein by reference.

TECHNICAL FIELD

The present invention relates to a travel control device which is applied to a hybrid vehicle capable of distributing power of an internal combustion engine to a first motor generator and a driving wheel by a differential mechanism and outputting power of a second motor generator to the driving wheel, and allows a vehicle to travel in acceleration/deceleration travel, in which acceleration travel and coasting travel are alternately repeated within a predetermined vehicle speed range.

BACKGROUND ART

A hybrid vehicle which can distribute power of an internal combustion engine to a first motor generator and a driving wheel by a differential mechanism, such as a planetary gear mechanism, and can output power of a second motor generator to the driving wheel is known. As a control device of such a vehicle, a control device which allows the vehicle to travel in acceleration/coasting travel, in which acceleration travel for driving the driving wheel with power of the internal combustion engine to accelerate the vehicle and coasting travel for stopping the internal combustion engine and allowing the vehicle to coast are repeatedly performed within a predetermined vehicle speed range is known. For example, a control device which, when the thermal efficiency of the internal combustion engine during travel of the vehicle in acceleration/coasting travel is higher than during travel of the vehicle at a constant speed, allows the vehicle in acceleration/coasting travel is known (see PTL 1). In addition, PTL 2 is also the prior art document relating to the invention.

CITATION LIST

Patent Literature

PTL 1: Japanese Patent Application Publication No. 2010-006309
PTL 2: Japanese Patent No. 4991555

SUMMARY OF THE INVENTION

In the hybrid vehicle described in PTL 1, there is a case where the total energy efficiency of the vehicle is not improved even if acceleration/coasting travel is performed in consideration of only the thermal efficiency of the internal combustion engine. For example, so-called power circulation occurs, in which, while the first motor generator generates electric power, the second motor generator consumes electric power during acceleration travel, and energy may be consumed wastefully. When the motor generator rotates, energy may be consumed wastefully with load generated due to the rotation.

Accordingly, an object of the invention is to provide a travel control device of a hybrid vehicle which can improve the total energy efficiency of the vehicle and can improve fuel efficiency.

According to an embodiment of the present invention, there is provided a travel control device which is applied to a hybrid vehicle including: an internal combustion engine, a first motor generator, an output part configured to transmit power to a driving wheel, a differential mechanism having three rotary elements capable of mutually performing differential rotation, a first rotary element among the three rotary elements being connected to the internal combustion engine, a second rotary element being connected to the first motor generator, and a third rotary element being connected to the output part, and a second motor generator capable of outputting power to the output part, the travel control device including: control means for, when a predetermined acceleration/deceleration travel condition is established during travel of the vehicle, setting a target vehicle speed range based on a requested speed requested for the vehicle, and controlling the internal combustion engine, the first motor generator, and the second motor generator such that the vehicle travels in an acceleration/deceleration travel mode in which acceleration travel for accelerating the vehicle with power output from the internal combustion engine with the internal combustion engine in an operation state and coasting travel for allowing the vehicle to coast with the internal combustion engine in a stop state are alternately repeated within the target vehicle speed range, wherein the control means includes engine control means for controlling the operation of the internal combustion engine such that given power is output from the internal combustion engine at the time of the acceleration travel and the vehicle is accelerated at an acceleration such that the rotation speed of either the first motor generator or the second motor generator becomes zero.

According to the travel control device of the invention, since the rotation speed of either the first motor generator or the second motor generator becomes zero at the time of the acceleration travel, it is possible to suppress the occurrence of power circulation at the time of the acceleration travel. With this, it is possible to reduce energy loss in the motor generator in which the rotation speed becomes zero. Furthermore, it is possible to improve power transmission efficiency in the vehicle. For this reason, it is possible to improve the total energy efficiency of the vehicle and to improve fuel efficiency.

In the travel control device according to above embodiment, the control means may include deceleration adjustment means for, when the requested speed is higher than a predetermined upper limit speed set in advance, controlling the operation of the second motor generator such that deceleration is equal to or lower than predetermined allowable deceleration at the time of the coasting travel. Since the higher the speed (vehicle speed) of the vehicle, the grater the travel resistance, the deceleration at the time of coasting travel becomes greater. If the deceleration becomes excessively great, the driver may feel a sense of discomfort. According to this embodiment, when the requested speed is higher than the upper limit speed, since the deceleration is equal to or lower than the allowable deceleration, it is possible to suppress a sense of discomfort to the driver.

In the travel control device according to above embodiment, the first motor generator and the second motor generator may be electrically connected to a battery, and the control means may include charging control means for, when the operation of the second motor generator is controlled by the deceleration adjustment means such that deceleration is equal to or lower than the allowable deceleration at the time of the coasting travel, causing the first motor generator to function as a generator at the time of the acceleration travel and driving the first motor generator with the internal combustion engine to charge the battery. In this way, the battery is charged at the time of the acceleration travel, whereby it is possible to suppress a decrease in the residual quantity of the battery even if electric power is consumed in the second motor generator at the time of the coasting travel.

In the travel control device according to above embodiment, there is provided a efficiency calculation means for calculating the energy efficiency of the vehicle when it is assumed that the vehicle is allowed to travel in the acceleration/deceleration travel mode and the energy efficiency of the vehicle when it is assumed that the vehicle is allowed to travel in a steady travel mode in which the vehicle is allowed to travel at a constant speed, wherein, when the acceleration/deceleration travel condition is established and the energy efficiency of the vehicle when it is assumed that the vehicle is allowed to travel in the acceleration/deceleration travel mode is greater than the energy efficiency when it is assumed that the vehicle is allowed to travel in the steady travel mode, the control means may control the internal combustion engine, the first motor generator, and the second motor generator such that the vehicle travels in the acceleration/deceleration travel mode. According to this embodiment, since the vehicle is allowed to travel in the acceleration/deceleration travel mode when the energy efficiency during travel of the vehicle in the acceleration/deceleration travel mode is greater than during travel of the vehicle in the steady travel mode, it is possible to further improve the total energy efficiency of the vehicle. For this reason, it is possible to further improve fuel efficiency.

In the travel control device according to above embodiment, when the requested speed is higher than a predetermined determination speed set in advance, the control means may control the internal combustion engine, the first motor generator, and the second motor generator such that the vehicle travels in a steady travel mode in which the vehicle is allowed to travel at a constant speed even if the acceleration/deceleration travel condition is established. If the vehicle is allowed to travel in the acceleration/deceleration travel mode when the vehicle speed is extremely high, load imposed on the internal combustion engine at the time of the acceleration travel may become excessive, and the fuel efficiency of the internal combustion engine may be deteriorated. According to this embodiment, the determination speed is appropriately set, whereby it is possible to allow the vehicle to travel in the steady travel mode when the vehicle speed is extremely high. For this reason, it is possible to suppress deterioration of fuel efficiency due to excessive load imposed on the internal combustion engine. Therefore, it is possible to further improve fuel efficiency.

In the travel control device according to above embodiment, the vehicle is provided with a transmission including a single pinion type planetary gear mechanism provided as the differential mechanism, a single pinion type first planetary gear mechanism for transmission, and a single pinion type second planetary gear mechanism for transmission, a ring gear of the planetary gear mechanism may be connected to an output shaft of the internal combustion engine, a sun gear of the planetary gear mechanism and a ring gear of the first planetary gear mechanism for transmission may be connected to a rotor of the first motor generator, a carrier of the planetary gear mechanism and a carrier of the first planetary gear mechanism for transmission may be connected through a rotary member, a sun gear of the first planetary gear mechanism for transmission, a sun gear of the second planetary gear mechanism for transmission, and a rotor of the second motor generator may be connected through a coupling member, a carrier of the second planetary gear mechanism for transmission may be connected to an output member which outputs power to the driving wheel, a ring gear of the second planetary gear mechanism for transmission may be provided with first brake means capable of braking the ring gear, the coupling member may be provided with second brake means capable of braking the coupling member, the carrier of the first planetary gear mechanism for transmission and the coupling member may be connected through first clutch means which is switchable between an engagement state where the carrier and the coupling member are coupled so as to rotate integrally and a release state where the coupling is released, the rotary member and the output member may be connected through second clutch means which is switchable between an engagement state where the rotary member and the output member are coupled so as to rotate integrally and a release state where the coupling is released, the transmission may be able to switch a mode between a low-speed mode, in which the ring gear of the second planetary gear mechanism for transmission is braked by the first brake means and the second clutch means is switched to the release state, and a high-speed mode, in which the braking of the ring gear of the second planetary gear mechanism for transmission by the first brake means is released and the second clutch means is switched to the engagement state, and the control means switches the transmission to the high-speed mode when the acceleration/deceleration travel condition may be established and may control the internal combustion engine, the first motor generator, and the second motor generator such that the vehicle travels in the acceleration/deceleration travel mode thereafter. When the transmission is switched to the high-speed mode, the rotary member and the output member rotate integrally; thus, the transmission gear ratio in the transmission becomes smaller compared to the low-speed mode. According to this embodiment, since the transmission is switched to the high-speed mode when the vehicle is allowed to travel in the acceleration/deceleration travel mode, drive force necessary for allowing the vehicle to travel in acceleration travel becomes small. With this, since it is possible to reduce energy at the time of the acceleration travel, it is possible to improve the total energy efficiency of the vehicle. Furthermore, it is thus possible to improve fuel efficiency.

BRIEF DESCRIPTION OF THE DRAWINGS

FIG. 1 is a diagram schematically showing a vehicle in which a travel control device according to a first embodiment of the invention is incorporated.

FIG. 17 is a diagram showing the correspondence relationship between the states of a first clutch, a second clutch, a first brake, and a second brake and a shift gear stage.

Figure 2:
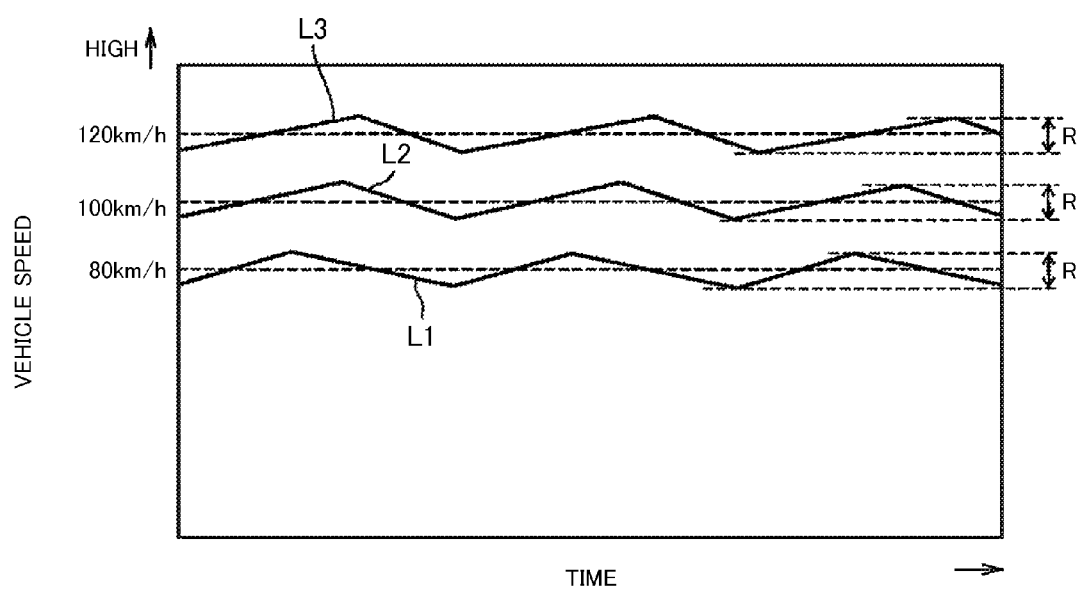
FIG. 2 is a diagram showing an example of an acceleration/deceleration pattern when a requested speed is 80 km/h, 100 km/h, and 120 km/h.

MODES FOR CARRYING OUT THE INVENTION (First Embodiment)

FIG. 1 schematically shows a vehicle in which a travel control device according to a first embodiment of the invention is incorporated. A vehicle 1A is constituted as a so-called hybrid vehicle. The vehicle 1A includes an internal combustion engine (hereinafter, referred to as an engine) 11, a first motor generator (hereinafter, abbreviated as a first MG) 12, and a second motor generator (hereinafter, abbreviated as a second MG) 13. The engine 11 is a known one which is mounted in the hybrid vehicle, and thus detailed description thereof will be omitted. The first MG 12 and the second MG 13 are known motor generators which function as an electric motor and a generator. The first MG 12 includes a rotor 12b which rotates integrally with an output shaft 12a, and a stator 12c which is arranged coaxially on the outer circumference of the rotor 12b and is fixed to a case (not shown). Similarly, the second MG 13 includes a rotor 13b which rotates integrally with an output shaft 13a, and a stator 13c which is arranged coaxially on the outer circumference of the rotor 13b and is fixed to the case.

An output shaft 11a of the engine 11 and the output shaft 12a of the first MG 12 are connected to a power distribution mechanism 14. An output part 15 which transmits power to a driving wheel 2 of the vehicle 1A is connected to the power distribution mechanism 14. The output part 15 includes a first drive gear 16, a counter gear 18 which is in mesh with the first drive gear 16 and is fixed to a counter shaft 17, and an output gear 19 which is fixed to the counter shaft 17. The output gear 19 is in mesh with a ring gear 20a provided in a case of a differential mechanism 20. The differential mechanism 20 is a known mechanism which distributes power transmitted to the ring gear 20a to the right driving wheel 2 and the left driving wheel 2. In FIG. 1, only one of the right driving wheel 2 and the left driving wheel 2 is shown.

The power distribution mechanism 14 includes a planetary gear mechanism 21 as a differential mechanism. The planetary gear mechanism 21 is a single pinion type planetary gear mechanism, and includes a sun gear Su which is an external gear, a ring gear Ri which is an internal gear arranged coaxially with the sun gear Su, and a carrier Ca which holds a pinion gear Pi in mesh with the gears Su and Ri so as to be rotatable and revolvable around the sun gear Su. The sun gear Su is coupled to the output shaft 12a of the first MG 12. The carrier Ca is coupled to the output shaft 11a of the engine 11. The ring gear Ri is coupled to the first drive gear 16. For this reason, the sun gear Su corresponds to an second rotary element of the invention, the carrier Ca corresponds to a first rotary element of the invention, and the ring gear Ri corresponds to a third rotary element of the invention.

As shown in the drawing, a second drive gear 22 is provided in the output shaft 13a of the second MG 13. The second drive gear 22 is in mesh with the counter gear 18. The first MG 12 and the second MG 13 are electrically connected to a battery 23 through an inverter and a boost converter (not shown).

The operations of the engine 11, the first MG 12, and the second MG 13 are controlled by a vehicle control device 30. The vehicle control device 30 is constituted as a computer unit including a microprocessor and peripherals, such as a RAM and a ROM, necessary for the operation of the microprocessor. The vehicle control device 30 holds various control programs for allowing the vehicle 1A to appropriately travel. The vehicle control device 30 executes the programs to perform control for control targets, such as the engine 11 and the MGs 12, 13. Various sensors which acquire information relating to the vehicle 1A are connected to the vehicle control device 30. For example, an accelerator opening sensor 31, a vehicle speed sensor 32, and an inter-vehicle distance sensor 33 are connected to the vehicle control device 30. The accelerator opening sensor 31 outputs a signal corresponding to the amount of depression of an accelerator pedal, that is, an accelerator opening. The vehicle speed sensor 32 outputs a signal corresponding to the speed (vehicle speed) of the vehicle 1A. The inter-vehicle distance sensor 33 outputs a signal corresponding to the distance (hereinafter, referred to as an inter-vehicle distance) between a preceding vehicle and the host vehicle 1A. In addition, although various sensors, switches, and the like are connected to the vehicle control device 30, these are omitted. When a navigation system is mounted in the vehicle 1A, the navigation system is also connected to the vehicle control device 30.

The vehicle 1A is provided with a plurality of travel modes. As a plurality of travel modes, for example, a steady travel mode and an acceleration/deceleration travel mode are set. In the steady travel mode, the engine 11, the first MG 12, and the second MG 13 are controlled such that the vehicle 1A travels at a constant speed. In the acceleration/deceleration travel mode, the engine 11, the first MG 12, and the second MG 13 are controlled such that acceleration travel and coasting travel are alternately repeated. In the acceleration travel of the acceleration/deceleration travel mode, the engine 11 is put in an operation state, and the driving wheel 2 is driven with power of the engine 11 to accelerate the vehicle 1A. In the coasting travel of the acceleration/deceleration travel mode, the engine 11 is stopped. The first MG 12, the second MG 13, and the boost converter are shut down. The vehicle 1A is allowed to coast. In this case, the vehicle 1A is decelerated with travel resistance. In the acceleration/deceleration travel mode, a target vehicle speed range R (see FIG. 2) is set based on a speed (requested speed) requested for the vehicle 1A, and acceleration travel and coasting travel, that is, acceleration and deceleration of the vehicle 1A are alternately repeated within the target vehicle speed range R.

FIG. 2 shows an example of an acceleration/deceleration pattern when the requested speed is 80 km/h, 100 km/h, and 120 km/h. In the drawing, a solid line L1 indicates an acceleration/deceleration pattern when the requested speed is 80 km/h. A solid line L2 indicates an acceleration/deceleration pattern when the requested speed is 100 km/h. A solid line L3 indicates an acceleration/deceleration pattern when the requested speed is 120 km/h. As shown in the drawing, each acceleration/deceleration pattern is set such that an average speed becomes the requested speed. For this reason, as the target vehicle speed range R, a range centering on the requested speed is set. Travel resistance at the time of coasting travel changes with the vehicle speed. For this reason, as shown in the drawing, the acceleration at the time of acceleration travel is changed according to the requested speed.

Figure 3:
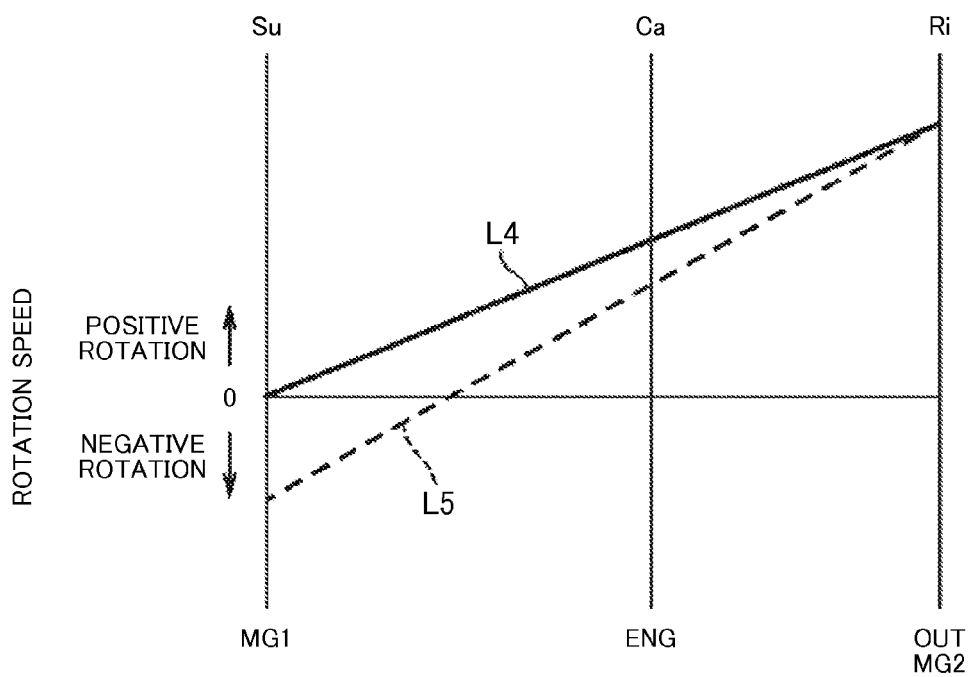
FIG. 3 is a diagram showing an example of an alignment chart during acceleration travel.

The acceleration at the time of acceleration travel is set such that the rotation speed of the first MG 12 during acceleration travel becomes zero. FIG. 3 shows an example of an alignment chart at the time of acceleration travel. In the drawing, "MG1" represents the first MG 12, "ENG" represents the engine 11, "MG2" represents the second MG 13, and "OUT" represents the first drive gear 16. Furthermore, "Su", "Ca", and "Ri" respectively represent the sun gear Su, the carrier Ca, and the ring gear Ri of the planetary gear mechanism 21. In the drawing, a solid line L4 indicates an alignment chart of the vehicle 1A at the time of acceleration travel. A broken line L5 indicates an alignment chart when the vehicle 1A is allowed to travel in the steady travel mode. Since the vehicle 1A is accelerated at the time of acceleration travel, load of the engine 11 increases. For this reason, the output power of the engine 11 is increased compared to the steady travel mode. With this, the engine 11 is operated in an operation region with high thermal efficiency. The acceleration at the time of acceleration travel is set such that, as shown in the drawing, given power is output from the engine 11 and the rotation speed of the first MG 12 becomes zero. That is, the acceleration at the time of acceleration travel is set such that the engine 11 can be operated in an operation region with high thermal efficiency at the time of acceleration travel, given power is output from the engine 11, and the rotation speed of the first MG 12 becomes zero. At the time of acceleration travel, the operation of the engine 11 is controlled such that the vehicle 1A is accelerated with the acceleration set in this manner.

The vehicle control device 30 switches the travel modes based on the travel state of the vehicle 1A. The vehicle control device 30 switches the travel mode to the acceleration/deceleration travel mode, for example, when a predetermined high-speed steady travel condition is established. For example, it may be determined whether or not the predetermined high-speed steady travel condition is established based on the speed and acceleration/deceleration of the vehicle 1A. For example, it may be determined that the high-speed steady travel condition is established when the speed of the vehicle 1A is substantially constant in a predetermined period of time, and there is little in the acceleration of the vehicle 1A in the predetermined period of time. In this case, the acceleration/deceleration when the high-speed steady travel condition is established may be displayed with an indicator or the like at the time of high-speed travel, and a driver may be requested to drive the vehicle 1A with the acceleration/deceleration. For example, information may be acquired from the navigation system, and it may be determined that the high-speed steady travel condition is established when it is considered that the vehicle 1A performs steady travel on a highway or the like. A switch which selects whether or not to execute the acceleration/deceleration travel mode may be provided, and it may be determined that the high-speed steady travel condition is established when the driver turns on the switch. However, even if the switch is turned on, when the accelerator opening is changed significantly or the deceleration of the vehicle 1A exceeds a predetermined threshold value, it is determined that the high-speed steady travel condition is not established, and the acceleration/deceleration travel mode is stopped. Thereafter, when the acceleration/deceleration of the vehicle 1A is equal to or less than the predetermined threshold value, it is determined that the high-speed steady travel condition is established, and the acceleration/deceleration travel mode is executed again. In addition, when the vehicle 1A is subject to cruise control, and when the vehicle speed is set through the cruise control, it may be determined that the high-speed steady travel condition is established. In this case, the vehicle 1A may be allowed to travel in an optimum acceleration/deceleration pattern for each vehicle speed recorded in advance.

Figure 4:
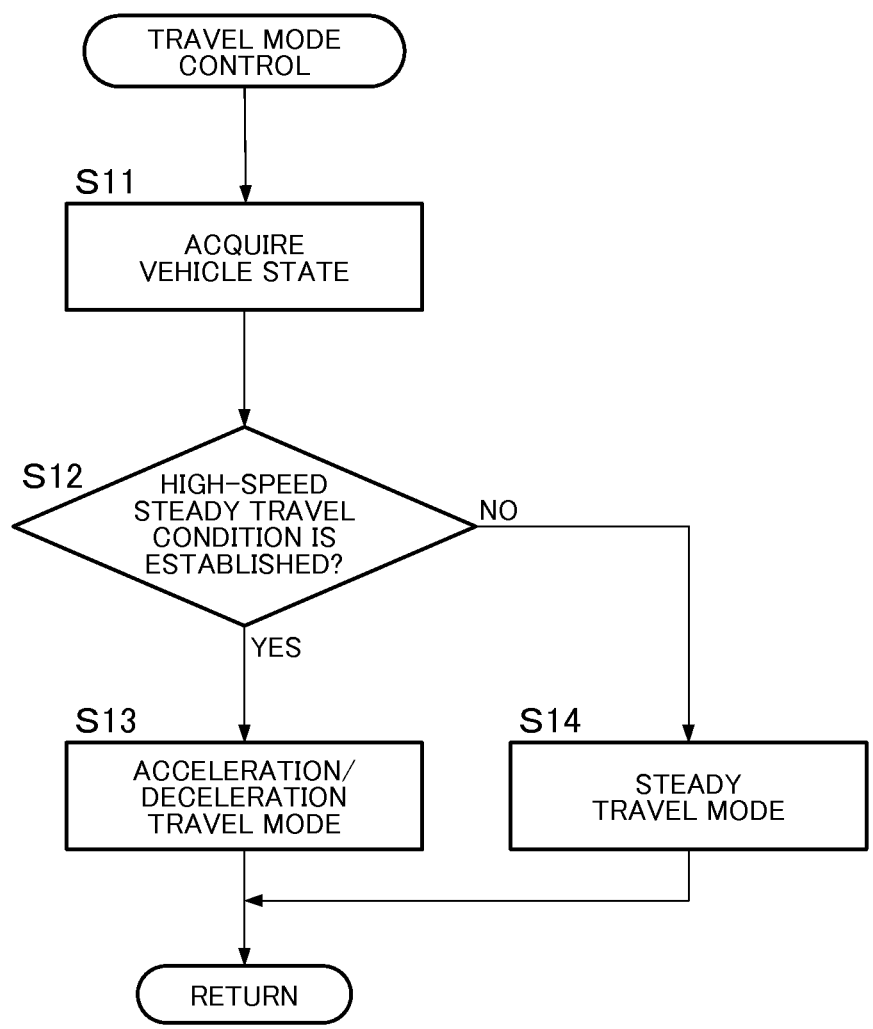
FIG. 4 is a flowchart showing a travel mode control routine which is executed by a vehicle control device.

FIG. 4 shows a travel mode control routine which is executed when the vehicle control device 30 switches the travel modes in this manner. This control routine is repeatedly executed in a predetermined period during travel of the vehicle 1A. By the execution of this control routine, the vehicle control device 30 functions as control means of the invention.

In this control routine, first, in Step S11, the vehicle control device 30 acquires the state of the vehicle 1A. As the state of the vehicle 1A, for example, the vehicle speed, the accelerator opening, and the inter-vehicle distance are acquired. In the processing, the acceleration/deceleration of the vehicle 1A is also acquired based on a change in vehicle speed or the like. In addition, when the navigation system is mounted in the vehicle 1A, information of a road, on which the vehicle 1A is traveling at present, or the like is acquired.

Next, in Step S12, the vehicle control device 30 determines whether or not the high-speed steady travel condition is established. The determination may be performed by any method described above. When it is determined that the high-speed steady travel condition is established, the process progresses to Step S13, and the vehicle control device 30 switches the travel mode to the acceleration/deceleration travel mode. As described above, in the processing, first, the target vehicle speed range R is set based on the requested speed. Furthermore, the acceleration at the time of acceleration travel is set. Thereafter, the engine 11, the first MG 12, and the second MG 13 are controlled such that acceleration travel and coasting travel are alternately repeated within the target vehicle speed range R. Thereafter, this control routine ends.

When it is determined that the high-speed steady travel condition is not established, the process progresses to Step S14, and the vehicle control device 30 switches the travel mode to the steady travel mode. In this case, as described above, the engine 11, the first MG 12, and the second MG 13 are controlled such that the vehicle 1A travels at the requested speed. Thereafter, this control routine ends.

As described above, according to the first embodiment, since the rotation speed of the first MG 12 becomes zero at the time of acceleration travel of the acceleration/deceleration travel mode, it is possible to suppress the occurrence of power circulation. For this reason, it is possible to reduce energy loss in the first MG 12 and to improve power transmission efficiency in the vehicle 1A. Furthermore, it is possible to operate the engine 11 in an operation region with high thermal efficiency. For this reason, it is possible to improve the total energy efficiency of the vehicle 1A. Therefore, it is possible to improve fuel efficiency.

The predetermined high-speed steady travel condition corresponds to an acceleration/deceleration travel condition of the invention. By the execution of Step S13 of FIG. 4, the vehicle control device 30 functions as engine control means of the invention.

(Second Embodiment)

Figure 5:
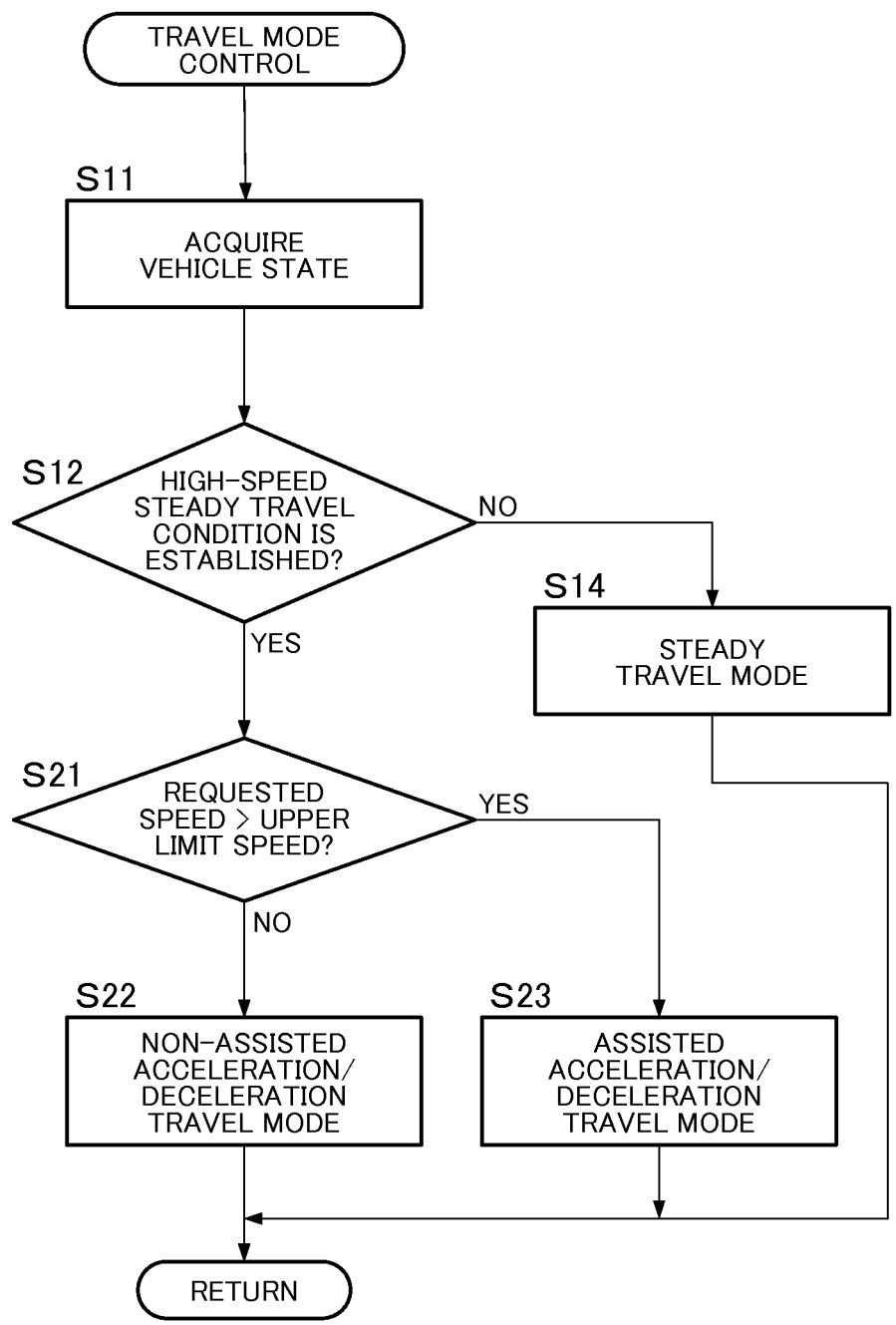
FIG. 5 is a flowchart showing a travel mode control routine which is executed by a vehicle control device in a travel control device according to a second embodiment of the invention.
Figure 6:
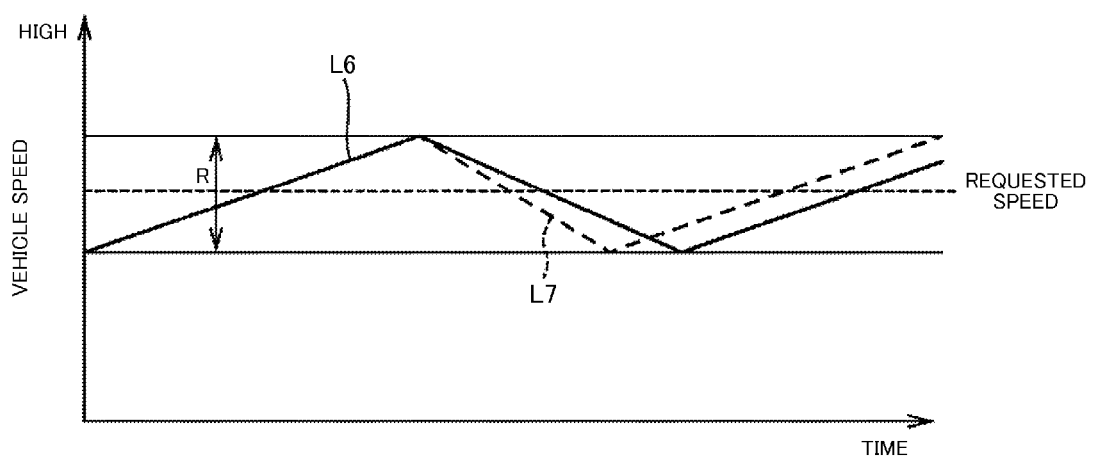
FIG. 6 is a diagram showing an example of an acceleration/deceleration pattern of an acceleration/deceleration travel mode which is executed in the second embodiment.
Figure 7:
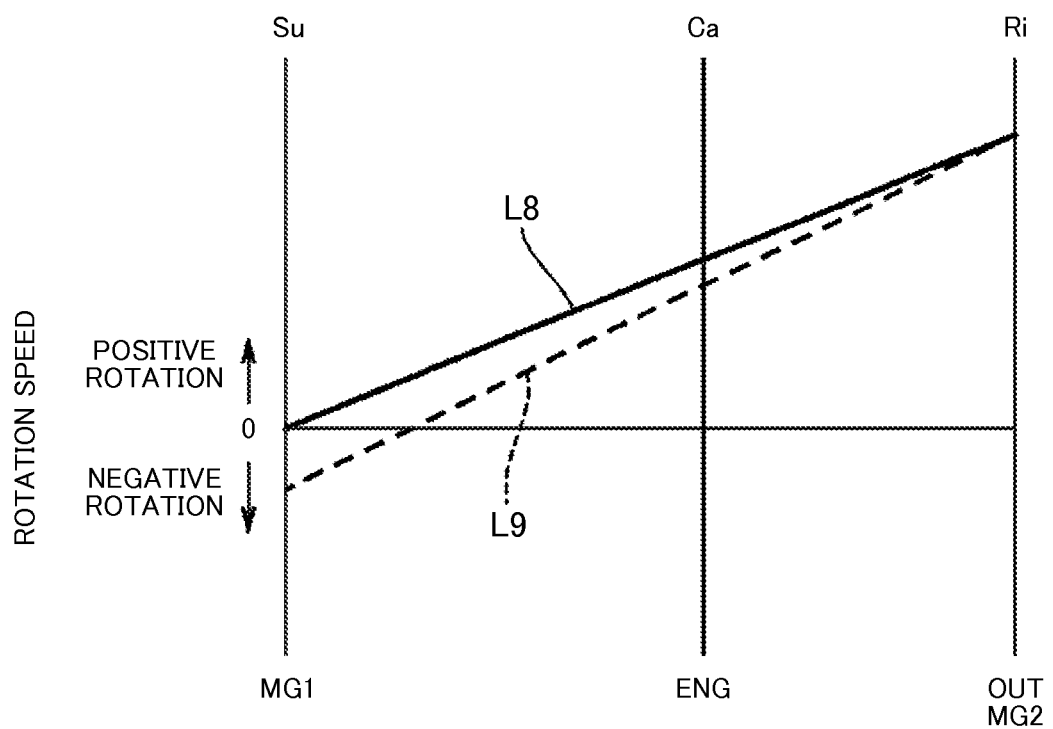
FIG. 7 is a diagram showing an example of an alignment chart of a vehicle at the time of acceleration travel in the second embodiment.

A travel control device according to a second embodiment of the invention will be described referring to FIGS. 5 to 7. In this embodiment, FIG. 1 is also referred to with regard to the vehicle 1A. FIG. 5 shows a travel mode control routine which is executed by the vehicle control device 30 in this embodiment. FIG. 6 shows an example of an acceleration/deceleration pattern in this embodiment. FIG. 7 shows an alignment chart of the vehicle 1A at the time of acceleration travel. In the drawings, the portions common to the first embodiment are represented by the same reference numerals, and description thereof will not be repeated.

As described above, the travel resistance at the time of coasting travel changes with the vehicle speed. The higher the vehicle speed, the greater the travel resistance. For this reason, if the vehicle speed becomes high, the deceleration at the time of coasting travel is increased, and the driver may feel a sense of discomfort. Accordingly, in this embodiment, when the vehicle speed is high, power is output from the second MG 13 at the time of coasting travel to decrease the deceleration. A solid line L6 of FIG. 6 indicates a temporal change in vehicle speed when power is output from the second MG 13. A broken line L7 of the drawing indicates a temporal change in vehicle speed when power is not output from the second MG 13. As will be apparent from the drawing, power is output from the second MG 13, thereby decreasing the deceleration. The magnitude of power output from the second MG 13 at the time of coasting travel may be appropriately set according to the vehicle speed such that the deceleration at the time of coasting travel is equal to or less than a deceleration such that the driver feels no sense of discomfort. The deceleration such that the driver feels no sense of discomfort corresponds to allowable deceleration of the invention. Hereinafter, an acceleration/deceleration travel mode in which power is output from the second MG 13 at the time of coasting travel to decrease the deceleration is referred to as an assisted acceleration/deceleration travel mode. Furthermore, an acceleration/deceleration travel mode in which power is not output from the second MG 13 at the time of coasting travel is referred to as a non-assisted acceleration/deceleration travel mode.

In this embodiment, as shown in FIG. 7, the engine 11 is controlled at the time of acceleration travel such that the rotation speed of the first MG 12 becomes zero. In the drawing, a solid line L8 indicates an alignment chart at the time of acceleration travel, and a broken line L9 represents an alignment chart when the vehicle 1A is allowed to travel in the steady travel mode.

In order to execute the control, the vehicle control device 30 executes a control routine of FIG. 5. This control routine is repeatedly executed in a predetermined period during travel of the vehicle 1A.

In this control routine, first, in Step S11, the vehicle control device 30 acquires the state of the vehicle 1A. Next, in Step S12, the vehicle control device 30 determines whether or not the high-speed steady travel condition is established. When it is determined that the high-speed steady travel condition is not established, the process progresses to Step S14, and the vehicle control device 30 switches the travel mode to the steady travel mode. Thereafter, this control routine ends.

When it is determined that the high-speed steady travel condition is established, the process progresses to Step S21, and the vehicle control device 30 determines whether or not the requested speed is higher than an upper limit speed set in advance. As the upper limit speed, for example, a lower limit value of a vehicle speed range in which the deceleration at the time of coasting travel when the non-assisted acceleration/deceleration travel mode is executed becomes a deceleration that the driver feels a sense of discomfort. Such a vehicle speed may be obtained in advance by an experiment, numerical calculation, or the like and may be stored in the ROM of the vehicle control device 30 as an upper limit speed.

When it is determined that the requested speed is equal to or lower than the upper limit speed, the process progresses to Step S22, and the vehicle control device 30 executes the non-assisted acceleration/deceleration travel mode. Thereafter, this control routine ends.

When it is determined that the requested speed is higher than the upper limit speed, the process progresses to Step S23, and the vehicle control device 30 executes the assisted acceleration/deceleration travel mode. Thereafter, this control routine ends.

As described above, according to the second embodiment, when the vehicle speed is high, the deceleration at the time of coasting travel is decreased; thus, it is possible to suppress a sense of discomfort to the driver.

By the execution of Steps S21, S23 of FIG. 5, the vehicle control device 30 functions as deceleration adjustment means of the invention.

Figure 8:
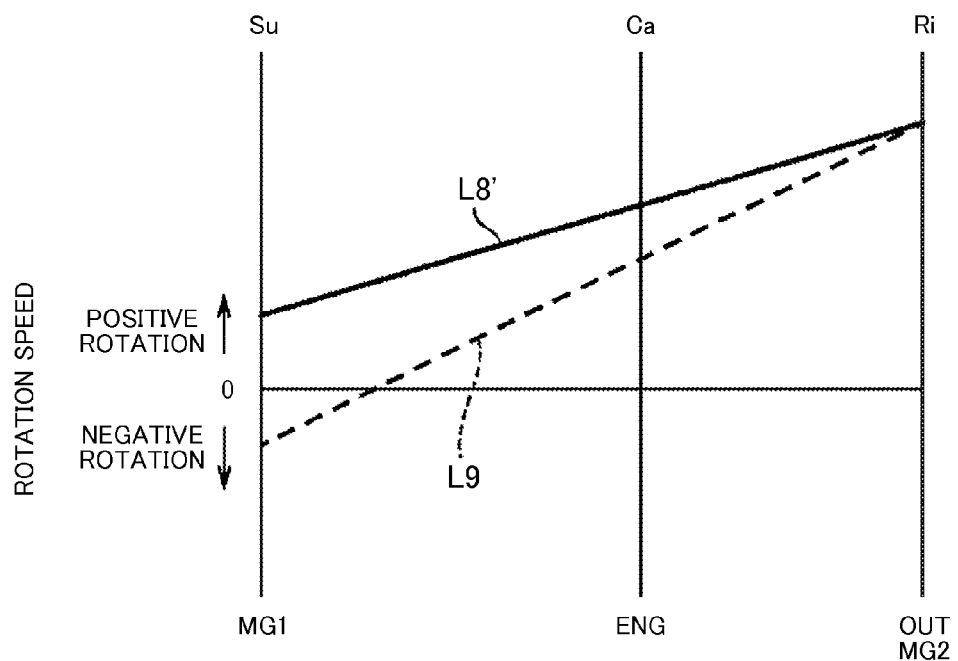
FIG. 8 is a diagram showing an example of an alignment chart of a vehicle at the time of acceleration travel in a modification example of the second embodiment.

In the assisted acceleration/deceleration travel mode, since power is output from the second MG 13 at the time of coasting travel, the residual quantity of the battery 23 decreases. Accordingly, in the assisted acceleration/deceleration travel mode, the first MG 12 may function as a generator at the time of acceleration travel, the driving wheel 2 may be driven with the engine 11, and the first MG 12 may be driven to charge the battery 23. A solid line L8' of FIG. 8 indicates an alignment chart of the vehicle 1A at the time of acceleration travel. In FIG. 8, the portions common to FIG. 7 are represented by the same reference numerals, and description thereof will not be repeated. As shown in the drawing, since electric power is generated in the first MG 12, the output power of the engine 11 is increased. Furthermore, since electric power is generated in the first MG 12, the rotation speed of the first MG 12 does not become zero.

In this modification example, since electric power is generated in the first MG 12 at the time of acceleration travel, it is possible to suppress a decrease in the residual quantity of the battery 23 during the execution of the acceleration/deceleration travel mode. Even if electric power is generated in the first MG 12 at the time of acceleration travel, electric power is charged in the battery 23; thus, power circulation does not occur. For this reason, even if fuel efficiency is deteriorated, the degree of deterioration is small. When the vehicle speed is high, even if the output power of the engine 11 is increased, the influence on the acceleration of the vehicle 1A is small. For this reason, it is possible to suppress a sense of discomfort to the driver.

The first MG 12 is controlled in this manner to charge the battery 23, whereby the vehicle control device 30 functions as charging control means of the invention.

(Third Embodiment)

Figure 9:
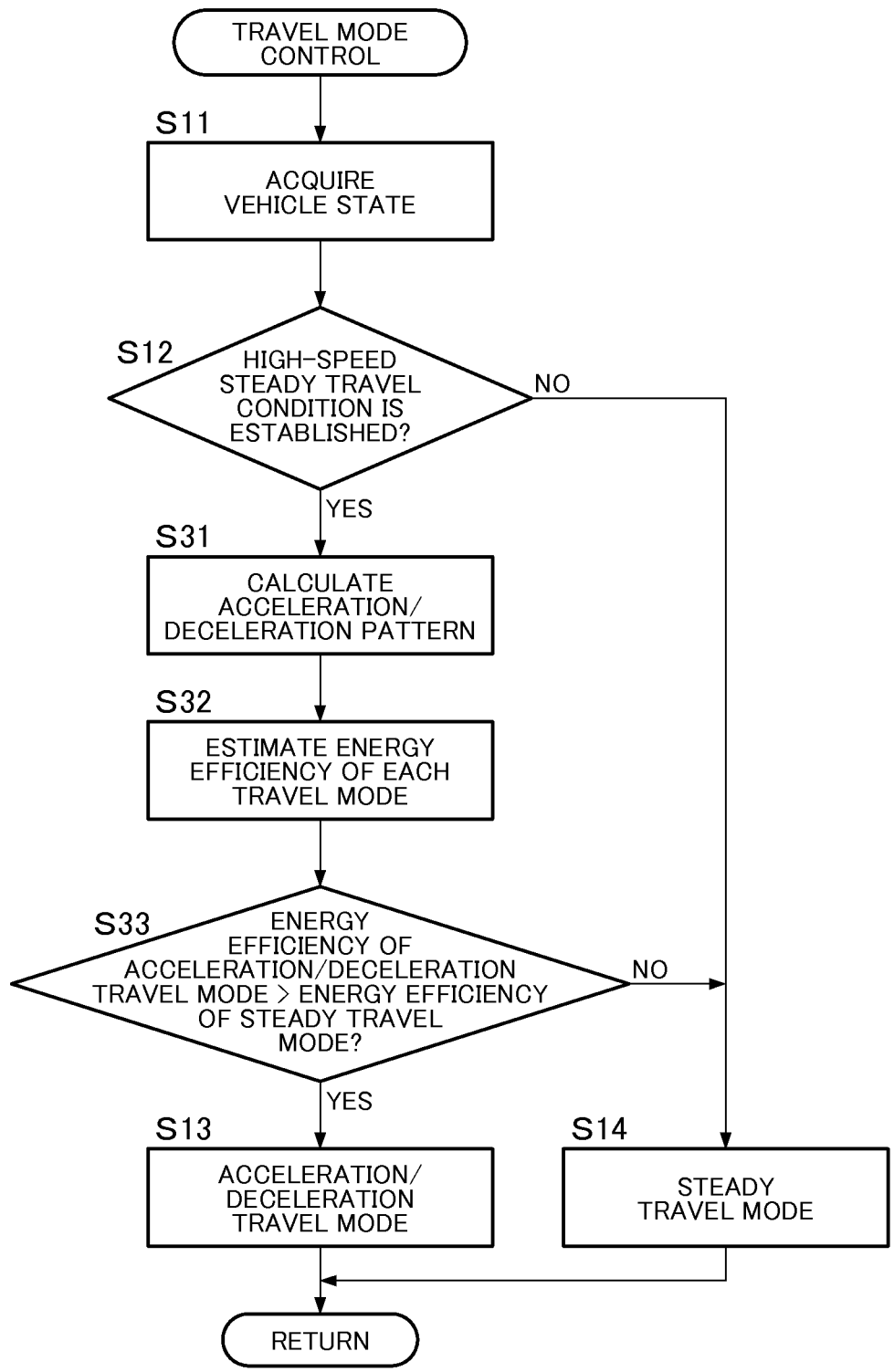
FIG. 9 is a flowchart showing a travel mode control routine which is executed by a vehicle control device in a travel control device according to a third embodiment of the invention.
Figure 10:
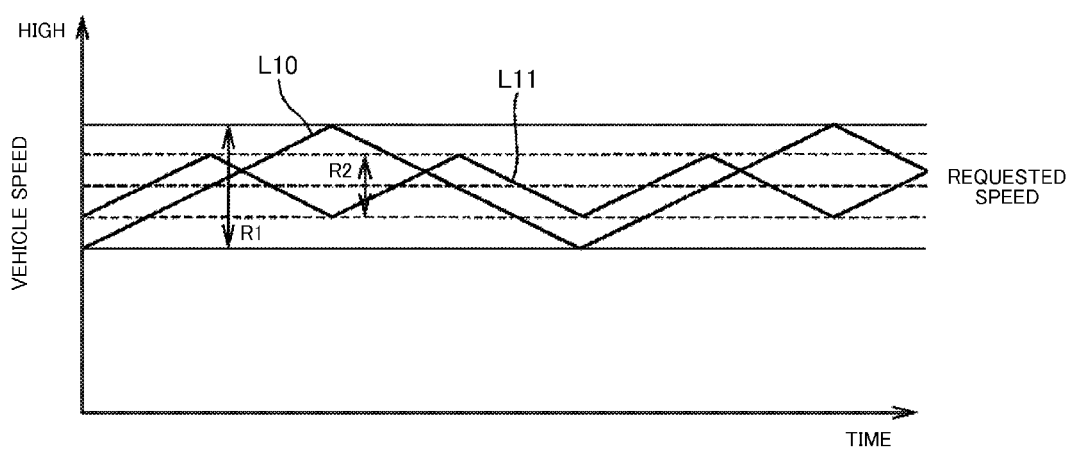
FIG. 10 is a diagram showing an example of an acceleration/deceleration pattern of an acceleration/deceleration travel mode which is executed in the third embodiment.
Figure 11:
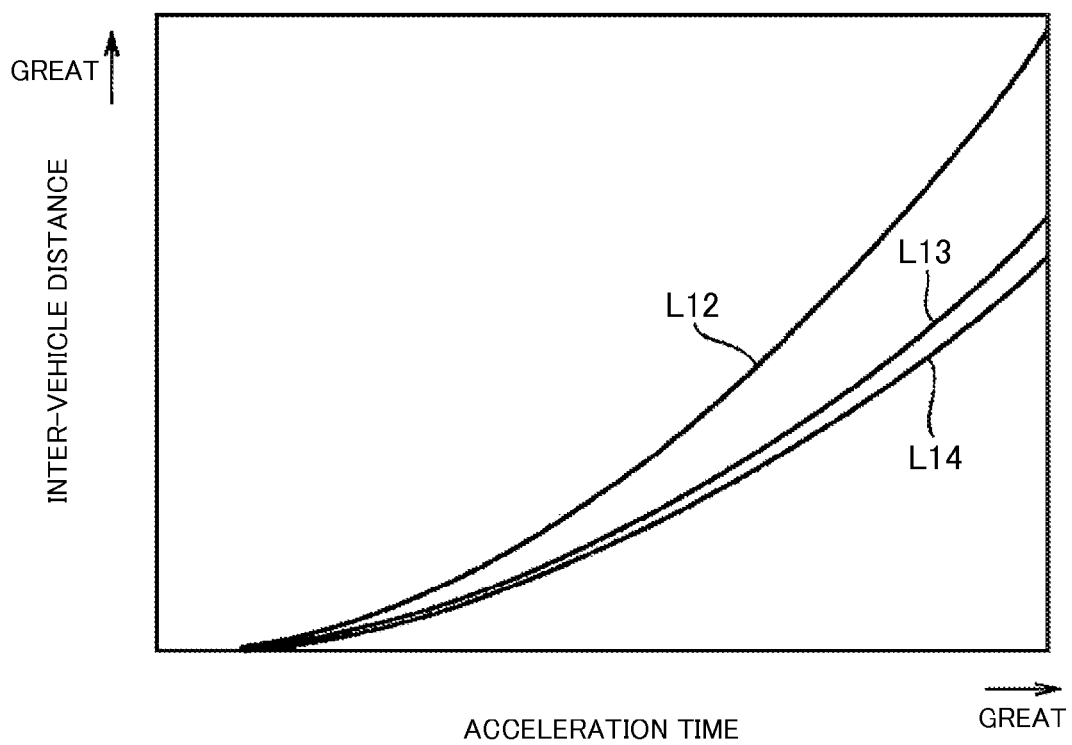
FIG. 11 is a diagram showing an example of the relationship between an inter-vehicle distance and an acceleration time.

A travel control device according to a third embodiment of the invention will be described referring to FIGS. 9 to 11. In this embodiment, FIG. 1 is also referred to with regard to the vehicle 1A. FIG. 9 shows a travel mode control routine which is executed by the vehicle control device 30 in this embodiment. FIG. 10 shows an example of an acceleration/deceleration pattern in this embodiment. In the drawings, the portions common to the above-described embodiments are represented by the same reference numerals, and description thereof will not be repeated.

In this embodiment, an acceleration/deceleration pattern of the acceleration/deceleration travel mode is set based on the inter-vehicle distance. The energy efficiency in the vehicle 1A during travel of the vehicle 1A in the acceleration/deceleration travel mode of the set acceleration/deceleration pattern is compared with the energy efficiency in the vehicle 1A during travel of the vehicle 1A in the steady travel mode, and the vehicle 1A is allowed to travel in the travel mode with greater energy efficiency.

In FIG. 10, an acceleration/deceleration pattern when the inter-vehicle distance is great is indicated by a solid line L10, and an acceleration/deceleration pattern when the inter-vehicle distance is small is indicated by a solid line L11. When the inter-vehicle distance is small, the time (acceleration time) of acceleration travel needs to be shortened so as not to approach a preceding vehicle in excess when the acceleration/deceleration travel mode is executed. FIG. 11 shows an example of the relationship between the inter-vehicle distance and the acceleration time. In the drawing, a solid line L12 indicates the relationship when the requested speed is 80 km/h, and a solid line L13 indicates the relationship when the requested speed is 100 km/h. A solid line L14 indicates the relationship when the requested speed is 120 km/h. As shown in the drawing, the greater the inter-vehicle distance, the longer the acceleration time. As well known in the art, the lower the vehicle speed, the lower the travel resistance on the vehicle 1A. For this reason, in order that the engine 11 is operated in an operation region with high thermal efficiency at the time of acceleration travel, and the rotation speed of the first MG 12 is zero, the acceleration needs to become great. Therefore, the lower the vehicle speed, the shorter the acceleration time to the inter-vehicle distance.

In this way, the acceleration/deceleration pattern in the acceleration/deceleration travel mode is set based on the requested speed and the inter-vehicle distance. Specifically, first, as in the above-described embodiment, the acceleration at the time of acceleration travel is set based on the requested speed. Next, the acceleration time is set based on the inter-vehicle distance. The acceleration time may be set using the relationship shown in FIG. 11. The relationship of the drawing may be obtained in advance by an experiment, numerical calculation, or the like and may be stored in the ROM of the vehicle control device 30 in the form of a map. By the determination of the acceleration time in this manner, the target vehicle speed range R is determined. As shown in FIG. 10 as an example, a target vehicle speed range R1 when the inter-vehicle distance is great is greater than a target vehicle speed range R2 when the inter-vehicle distance is small. The deceleration at the time of coasting travel is determined by the travel resistance; thus, by the determination of the acceleration and the acceleration time in this manner, the acceleration/deceleration pattern is determined.

As indicated by the solid line L10 in FIG. 10, when the inter-vehicle distance is great, a sufficient acceleration time can be secured; thus, it is possible to secure a sufficient time of coasting travel. For this reason, it is possible to reduce the operation time of the engine 11. Furthermore, since load of the engine 11 increases during acceleration travel, the engine 11 is operated in an operation region with high thermal efficiency. Since the rotation speed of the first MG 12 becomes zero, power circulation does not occur and power transmission efficiency is improved. For this reason, energy efficiency is improved compared to the steady travel mode.

As indicated by the solid line L11 in FIG. 10, when the inter-vehicle distance is small, the acceleration time decreases; thus, a sufficient time of coasting travel cannot be secured. For this reason, the operation time of the engine 11 is extended. Therefore, energy efficiency is deteriorated compared to the steady travel mode. In this case, since energy efficiency is improved when the vehicle 1A is allowed to travel in the steady travel mode, the vehicle control device 30 allows the vehicle 1A to travel in the steady travel mode even if the high-speed steady travel condition is established.

In order to execute this control, the vehicle control device 30 executes a control routine of FIG. 9. This control routine is repeatedly executed in a predetermined period during travel of the vehicle 1A.

In this control routine, the vehicle control device 30 advances processing to Step S12 similarly to the control routine of FIG. 4. In Step S12, when it is determined that the high-speed steady travel condition is established, the process progresses to Step S31, and the vehicle control device 30 calculates an acceleration/deceleration pattern in the acceleration/deceleration travel mode. The acceleration/deceleration pattern may be calculated based on the requested speed and the inter-vehicle distance by the above-described method. Subsequently, in Step S32, the vehicle control device 30 estimates energy efficiency when it is assumed that the vehicle 1A is allowed to travel in the steady travel mode and energy efficiency when it is assumed that the vehicle 1A is allowed to travel in the acceleration/deceleration travel mode. The energy efficiency of the steady travel mode may be calculated based on the requested speed by a known method. The energy efficiency of the acceleration/deceleration travel mode may be calculated based on the calculated acceleration/deceleration pattern. In the acceleration/deceleration travel mode, the engine 11 is operated only during acceleration travel; thus, energy efficiency may be calculated based on the operation state of the engine 11 for the period of time by a known method.

Next, in Step S33, the vehicle control device 30 determines whether or not the energy efficiency of the acceleration/deceleration travel mode is greater than the energy efficiency of the steady travel mode. When it is determined that the energy efficiency of the acceleration/deceleration travel mode is greater than the energy efficiency of the steady travel mode, the process progresses to Step S13, and the vehicle control device 30 switches the travel mode to the acceleration/deceleration travel mode. Thereafter, this control routine ends. When it is determined that the energy efficiency of the acceleration/deceleration travel mode is equal to or less than the energy efficiency of the steady travel mode, the process progresses to Step S14, and the vehicle control device 30 switches the travel mode to the steady travel mode. Thereafter, this control routine ends.

According to the third embodiment, when the energy efficiency of the acceleration/deceleration travel mode is greater than the energy efficiency of the steady travel mode, the travel mode is switched to the acceleration/deceleration travel mode, and when the energy efficiency of the acceleration/deceleration travel mode is equal to or less than the energy efficiency of the steady travel mode, the travel mode is switched to the steady travel mode. For this reason, it is possible to further improve the energy efficiency of the vehicle 1A.

By the execution of Step S32 of FIG. 9, the vehicle control device 30 functions as efficiency calculation means of the invention.

(Fourth Embodiment)

Figure 12:
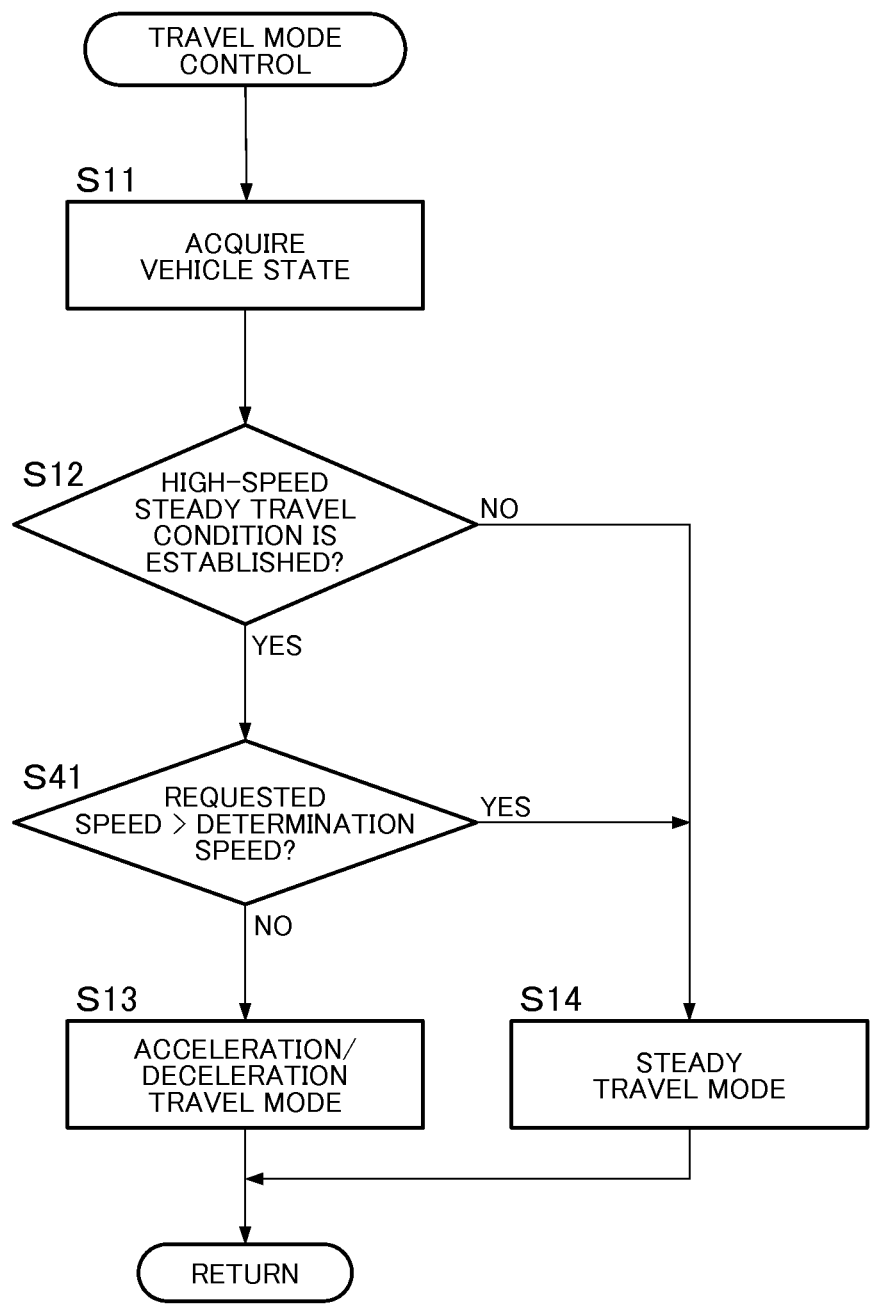
FIG. 12 is a flowchart showing a travel mode control routine which is executed by a vehicle control device in a travel control device according to a fourth embodiment of the invention.

A travel control device according to a fourth embodiment of the invention will be described referring to FIG. 12. In this embodiment, FIG. 1 is also referred to with regard to the vehicle 1A. FIG. 12 shows a travel mode control routine which is executed by the vehicle control device 30 in this embodiment. In the drawing, the portions common to the above-described embodiments are represented by the same reference numerals, and description thereof will not be repeated.

When the vehicle speed is extremely high, if the acceleration/deceleration travel mode is executed, load imposed on the engine 11 at the time of acceleration travel may become excessive, and the fuel efficiency of the engine 11 may be deteriorated. Accordingly, in this case, the steady travel mode is executed even if the high-speed steady travel condition is established.

In order to execute this control, the vehicle control device 30 executes a control routine of FIG. 12. This control routine is repeatedly executed in a predetermined period during travel of the vehicle 1A. In this control routine, the vehicle control device 30 advances processing to Step S12 similarly to the control routine of FIG. 4. In Step S12, when it is determined that the high-speed steady travel condition is established, the process progresses to Step S41, and the vehicle control device 30 determines whether or not the requested speed is higher than a predetermined determination speed. As the determination speed, for example, a vehicle speed at which the engine 11 can be operated in an operation region with high thermal efficiency when the vehicle 1A is allowed to travel in the steady travel mode is set. As the determination speed, a speed higher than the upper limit speed of the second embodiment is set.

When it is determined that the requested speed is equal to or lower than the determination speed, the process progresses to Step S13, and the vehicle control device 30 switches the travel mode to the acceleration/deceleration travel mode. Thereafter, this control routine ends. When it is determined that the requested speed is higher than the determination speed, the process progresses to Step S14, and the vehicle control device 30 switches the travel mode to the steady travel mode. Thereafter, this control routine ends.

According to the fourth embodiment, when the vehicle speed is extremely high, the travel mode is switched to the steady travel mode; thus, it is possible to suppress deterioration of fuel efficiency due to excessive load imposed on the engine 11. For this reason, it is possible to further improve fuel efficiency.

(Fifth Embodiment)

Figure 13:
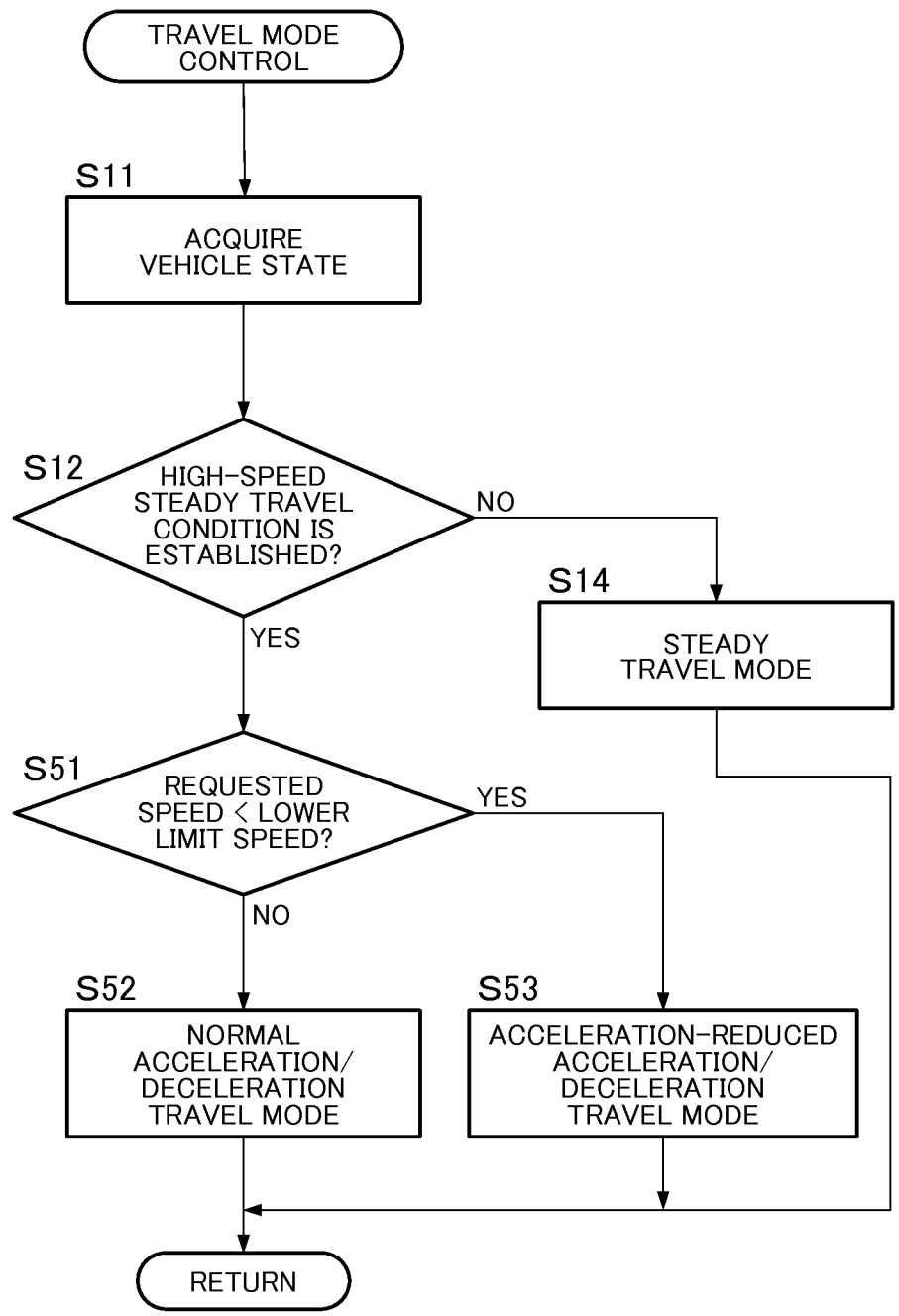
FIG. 13 is a flowchart showing a travel mode control routine which is executed by a vehicle control device in a travel control device according to a fifth embodiment of the invention.
Figure 14:
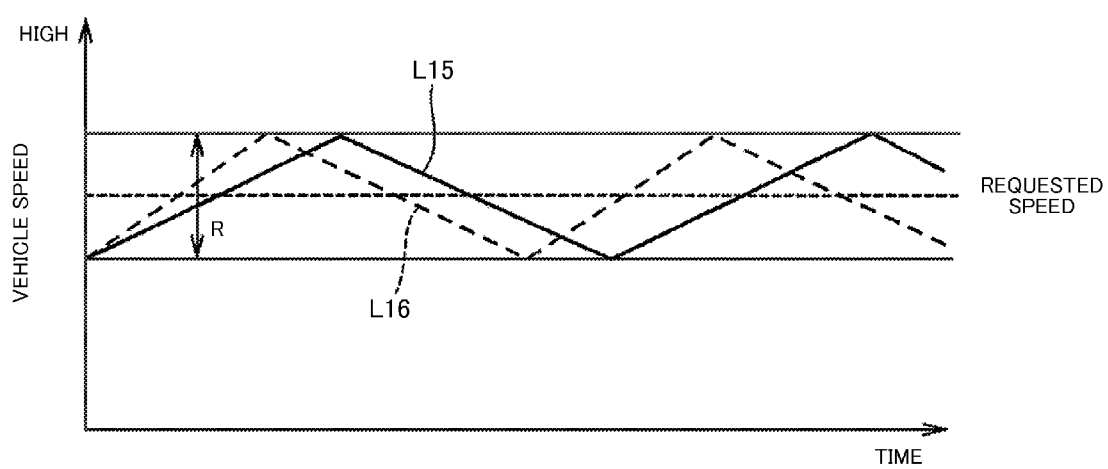
FIG. 14 is a diagram showing an example of an acceleration/deceleration pattern of an acceleration/deceleration travel mode which is executed in the fifth embodiment.
Figure 15:
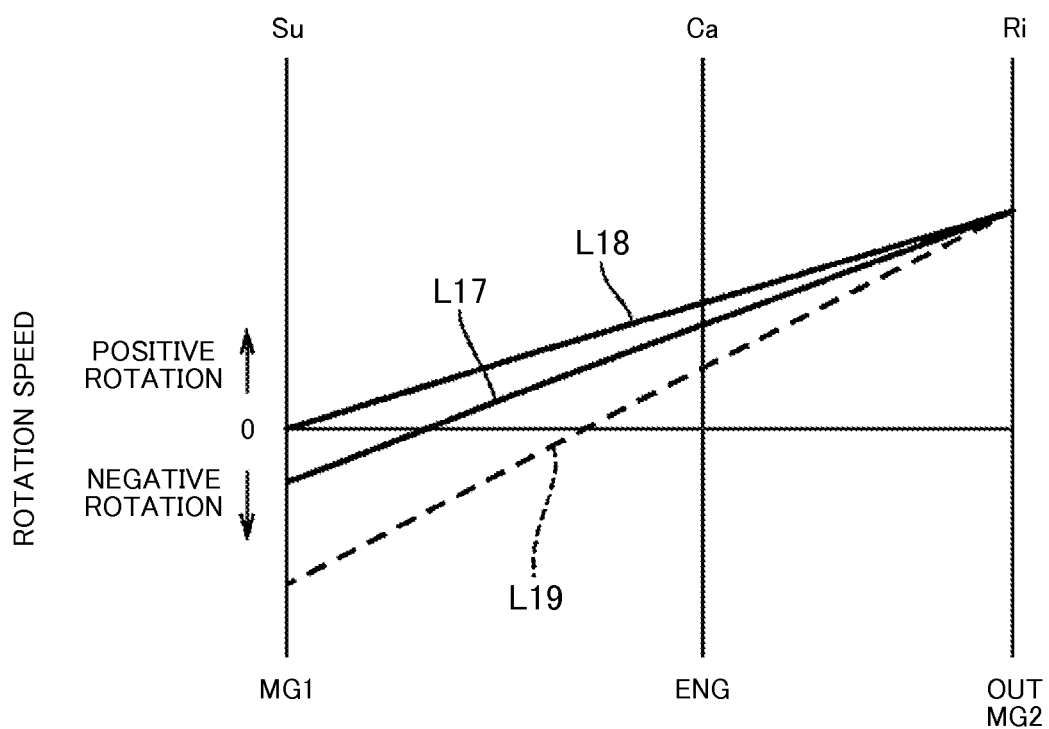
FIG. 15 is a diagram showing an example of an alignment chart of a vehicle at the time of acceleration travel in the fifth embodiment.

A travel control device according to a fifth embodiment of the invention will be described referring to FIGS. 13 to 15. In this embodiment, FIG. 1 is also referred to with regard to the vehicle 1A. FIG. 13 shows a travel mode control routine which is executed by the vehicle control device 30 in this embodiment. FIG. 14 shows an example of an acceleration/deceleration pattern in this embodiment. FIG. 15 shows an alignment chart of vehicle 1A at the time of acceleration travel. In the drawings, the portions common to the above-described embodiments are represented by the same reference numerals, and description thereof will not be repeated.

As described above, the acceleration in the acceleration/deceleration travel mode is set such that the rotation speed of the first MG 12 becomes zero at the time of acceleration travel. When the acceleration is set in this manner, the lower the vehicle speed, the greater the acceleration. For this reason, when the vehicle speed is low, the acceleration may become excessively great, and the driver may feel a sense of discomfort. Accordingly, in this case, the vehicle 1A is accelerated at an acceleration such that the driver feels no sense of discomfort at the time of acceleration travel. A solid line L15 of FIG. 14 indicates an acceleration/deceleration pattern when the vehicle 1A is accelerated at an acceleration such that the driver feels no sense of discomfort at the time of acceleration travel. A broken line L16 of the drawing indicates an acceleration/deceleration pattern when the vehicle 1A is accelerated at an acceleration such that the rotation speed of the first MG 12 becomes zero. A solid line L17 of FIG. 15 indicates an alignment chart when the vehicle 1A is accelerated at the acceleration such that the driver feels no sense of discomfort. A solid line L18 of the drawing indicates an alignment chart when the vehicle 1A is accelerated at the acceleration such that the rotation speed of the first MG 12 becomes zero, and a broken line L19 indicates an alignment chart when the vehicle 1A is allowed to travel in the steady travel mode. As shown in the drawing, when the vehicle 1A is accelerated at the acceleration such that the driver feels no sense of discomfort, the rotation speed of the first MG 12 cannot be zero. However, since the output of the engine 11 increases compared to a case where the vehicle 1A is allowed to travel in the steady travel mode, fuel efficiency is improved compared to the steady travel mode.

In order to execute this control, the vehicle control device 30 executes a control routine of FIG. 13. This control routine is repeatedly executed in a predetermined period during travel of the vehicle 1A. In this control routine, the vehicle control device 30 advances processing to Step S12 similarly to the control routine of FIG. 4. In Step S12, when it is determined that the high-speed steady travel condition is established, the process progresses to Step S51, and the vehicle control device 30 determines whether or not the requested speed is less than a predetermined lower limit speed. As the lower limit speed, for example, an upper limit value of a vehicle speed range in which the acceleration such that the rotation speed of the first MG 12 becomes zero becomes the acceleration such that the driver feels a sense of discomfort is set. Such a vehicle speed may be obtained in advance by an experiment, numerical calculation, or the like and may be stored in the ROM of the vehicle control device 30 as a lower limit speed.

When it is determined that the requested speed is equal to or higher than the lower limit speed, the process progresses to Step S52, and the vehicle control device 30 executes the normal acceleration/deceleration travel mode. In the normal acceleration/deceleration travel mode, the vehicle 1A travels at the acceleration such that the rotation speed of the first MG 12 becomes zero at the time of acceleration travel. That is, this processing is the same processing as Step S13 of FIG. 4. For this reason, description thereof will not be repeated. Thereafter, this control routine ends.

When it is determined that the requested speed is less than the lower limit speed, the process progresses to Step S53, and the vehicle control device 30 executes an acceleration-reduced acceleration/deceleration travel mode. In this travel mode, as described above, the vehicle 1A is accelerated at the acceleration such that the driver feels no sense of discomfort at the time of acceleration travel. Such acceleration may be obtained in advance by an experiment, numerical calculation, or the like and may be stored in the ROM of the vehicle control device 30. Thereafter, this control routine ends.

As described above, according to the fifth embodiment, when the driver feels a sense of discomfort due to acceleration at the acceleration such that the rotation speed of the first MG 12 becomes zero at the time of acceleration travel, the acceleration is decreased. However, in this case, it is also possible to improve fuel efficiency compared to the steady travel mode. For this reason, it is possible to improve fuel efficiency while suppressing a sense of discomfort to the driver.

(Sixth Embodiment)

Figure 16:
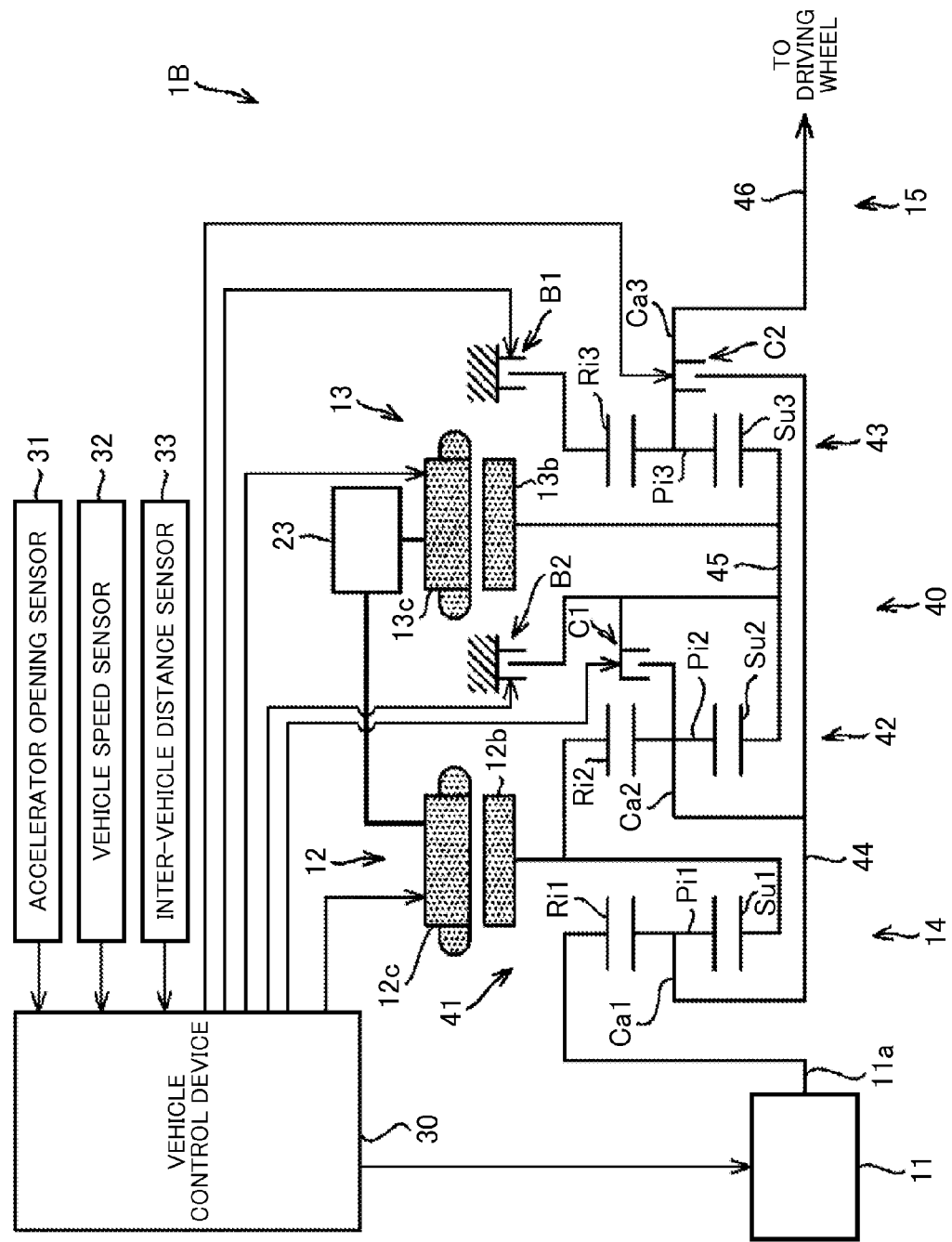
FIG. 16 is a diagram schematically showing a vehicle in which a travel control device according to a sixth embodiment of the invention is incorporated.

A travel control device according to a sixth embodiment of the invention will be described referring to FIGS. 16 to 21. FIG. 16 schematically shows a vehicle 1B in which the travel control device according to the sixth embodiment is incorporated. In the drawing, the portions common to FIG. 1 are represented by the same reference numerals, and description thereof will not be repeated.

As shown in the drawing, the vehicle 1B is provided with a transmission 40. The engine 11, the first MG 12, and the second MG 13 are connected to the transmission 40. The transmission 40 includes a first planetary gear mechanism 41, a second planetary gear mechanism 42, and a third planetary gear mechanism 43. All of the planetary gear mechanisms 41, 42, 43 are constituted as a single pinion type planetary gear mechanism. The first planetary gear mechanism 41 includes a sun gear Su1 which is an external gear, a ring gear Ri1 which is an internal gear arranged coaxially with the sun gear Su1, and a carrier Ca1 which holds a pinion gear Pi1 in mesh with the gears Su1, Ri1 so as to be rotatable and revolvable around the sun gear Su1. Hereinafter, the sun gear Su1, the ring gear Ri1, and the carrier Ca1 of the first planetary gear mechanism 41 are respectively referred to as a first sun gear Su1, a first ring gear Ri1, and a first carrier Ca1.

The second planetary gear mechanism 42 includes a sun gear Su2 which is an external gear, a ring gear Ri2 which is an internal gear arranged coaxially with the sun gear Su2, and a carrier Ca2 which holds a pinion gear Pi2 in mesh with the gears Su2, Ri2 so as to be rotatable and revolvable around the sun gear Su2. Hereinafter, the sun gear Su2, the ring gear Ri2, and the carrier Ca2 of the second planetary gear mechanism 42 are respectively referred to as a second sun gear Su2, a second ring gear Ri2, and a second carrier Ca2. The third planetary gear mechanism 43 includes a sun gear Su3 which is an external gear, a ring gear Ri3 which is an internal gear arranged coaxially with the sun gear Su3, and a carrier Ca3 which holds a pinion gear Pi3 in mesh with the gears Su3, Ri3 so as to be rotatable and revolvable around the sun gear Su3. Hereinafter, the sun gear Su3, the ring gear Ri3, and the carrier Ca3 of the third planetary gear mechanism 43 are respectively referred to as the third sun gear Su3, the third ring gear Ri3, and the third carrier Ca3.

As shown in the drawing, the first ring gear Ri1 is coupled to the output shaft 11a of the engine 11. The first sun gear Su1 and the second ring gear Ri2 are coupled to the rotor 12b of the first MG 12. The first carrier Ca1 and the second carrier Ca2 are coupled to a rotation shaft 44 as a rotary member. The second sun gear Su2 and the third sun gear Su3 are coupled to the rotor 13b of the second MG 13 through a coupling shaft 45 as a coupling member. The coupling shaft 45 is coupled to the second carrier Ca2 through a first clutch C1. The first clutch C1 is constituted so as to be switchable between an engagement state when the second carrier Ca2 and the coupling shaft 45 rotate integrally and a release state where the second carrier Ca2 is separated from the coupling shaft 45. The third carrier Ca3 is coupled to an output shaft 46 as an output member. Though not shown, the output shaft 46 is coupled to the driving wheel 2 through the differential mechanism 20. The output shaft 46 is coupled to the rotation shaft 44 through a second clutch C2. The second clutch C2 is constituted so as to be switchable between an engagement state where the output shaft 46 and the rotation shaft 44 rotate integrally and a release state where the rotation shaft 44 is separated from the output shaft 46. The third ring gear Ri3 is provided with a first brake B1 which is switchable between a braking state where the third ring gear Ri3 is braked and a release state where braking is released. The coupling shaft 45 is provided with a second brake B2 which is switchable between a braking state where the coupling shaft 45 is braked and a release state where braking is released.

In the transmission 40, a shift gear stage is switched by appropriately switching the states of the first clutch C1, the second clutch C2, the first brake B1, and the second brake B2. FIG. 17 shows the correspondence relationship between the states of a first clutch 45, a second clutch 49, a first brake 46, and a second brake 47 and each shift gear stage. In the drawing, "C1" represents the first clutch C1, and "C2" represents the second clutch C2. Furthermore, "○" of the clutches C1, C2 indicates that the clutches C1, C2 are put in the engagement state. On the other hand, "x" indicates that the clutches C1, C2 are put in the release state. In the drawing, "B1" represents the first brake B1, and "B2" represents the second brake B2. Furthermore, "○" of the brakes B1, B2 indicates that the brakes B1, B2 are put in the braking state. On the other hand, "x" indicates that the brakes B1, B2 are put in the release state. As shown in the drawing, the transmission 40 can switch the shift gear stage among a first gear speed to a fourth gear speed.

Figure 18:
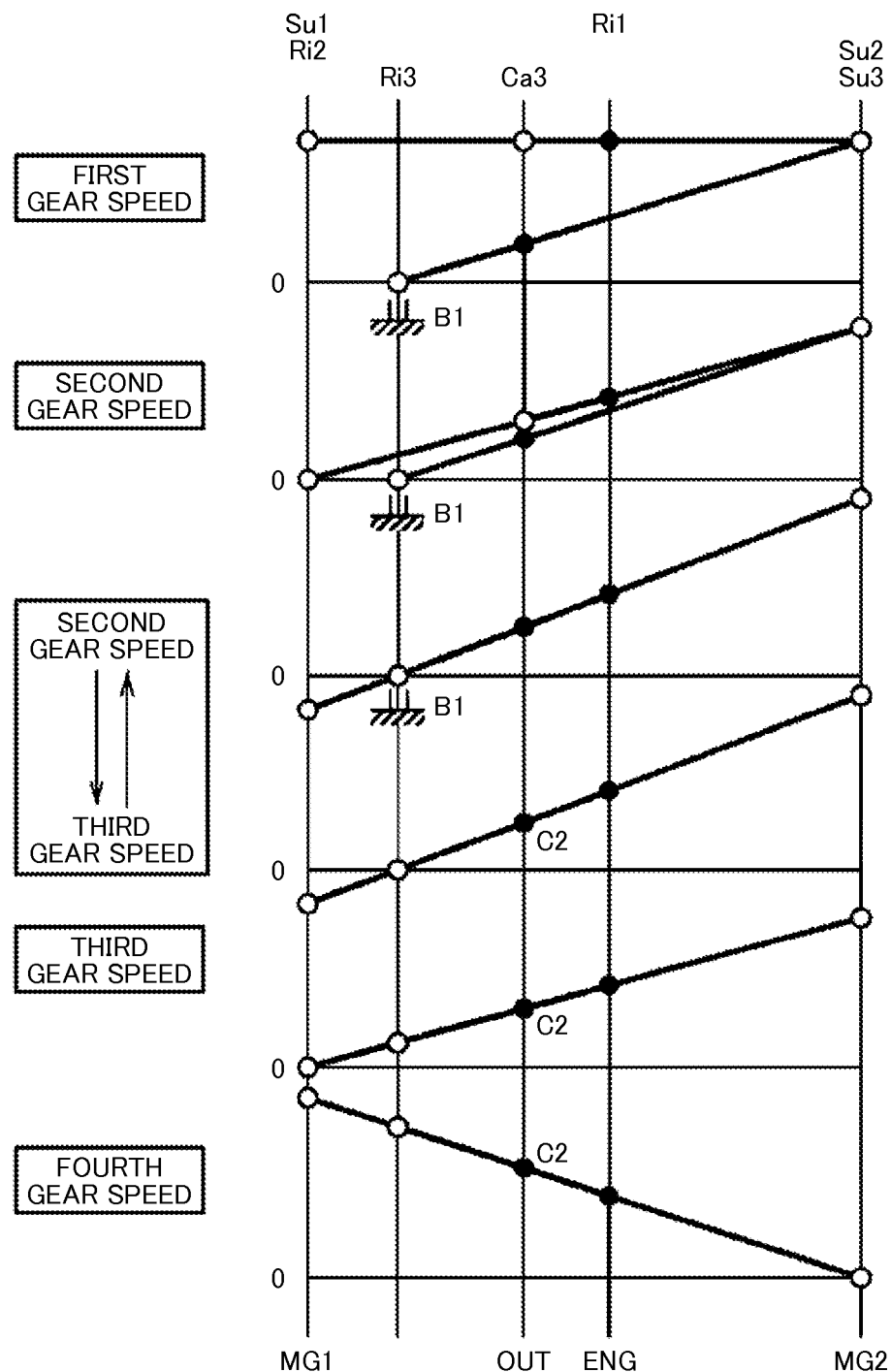
FIG. 18 is a diagram showing an example of an alignment chart of a transmission at each shift gear stage.

FIG. 18 shows an example of an alignment chart of the transmission 40 at each shift gear stage. In the drawing, "MG1" represents the first MG 12, "ENG" represents the engine 11, "MG2" represents the second MG 13, and "OUT" represents the output shaft 46. "Su1", "Ca1", and "Ri1" respectively represent the first sun gear Su1, the first carrier Ca1, and the first ring gear Ri1. "Su2", "Ca2", and "Ri2" respectively represent the second sun gear Su2, the second carrier Ca2, and the second ring gear Ri2. "Su3", "Ca3", and "Ri3" respectively represent the third sun gear Su3, the third carrier Ca3, and the third ring gear Ri3. "B1" represents the first brake B1, and "C2" represents the second clutch C2.

As shown in the drawing, at the first gear speed and the second gear speed, the first brake B1 is put in the braking state, and the second clutch C2 is put in the release state. In this case, the first carrier Ca1 and the second carrier Ca2 are separated from the output shaft 46. For this reason, on the alignment chart, two lines representing the relationship of the rotation speeds of the respective rotary elements are generated. In this case, since the power of the engine 11 is transmitted to the output shaft 46 through the planetary gear mechanisms 41 to 43, the transmission gear ratio becomes great. Hereinafter, the first gear speed and the second gear speed may be referred to as a Lo mode. On the other hand, at the third gear speed and the fourth gear speed, the first brake B1 is put in the release state, and the second clutch C2 is put in the engagement state. In this case, the first carrier Ca1, the second carrier Ca2, and the output shaft 46 rotate integrally. For this reason, the number of lines representing the relationship of the rotation speeds of the respective rotary elements becomes one. In this case, since the power of the engine 11 is transmitted to the output shaft 46 through the first planetary gear mechanism 41, the transmission gear ratio becomes small. Hereinafter, the third gear speed and the fourth gear speed may be referred to as a Hi mode.

In switching from the second gear speed to the third gear speed, the engine 11, the first MG 12, and the second MG 13 are controlled such that the two lines representing the relationship of the rotation speeds of the respective rotary elements overlap each other, and when the two lines overlap each other, the first brake B1 is put in the release state and the second clutch C2 is put in the engagement state. On the other hand, in switching from the third gear speed to the second gear speed, the engine 11, the first MG 12, and the second MG 13 are controlled such that the rotation speed of the third ring gear Ri3 becomes zero, and when the rotation speed of the third ring gear Ri3 becomes zero, the first brake B1 is put in the braking state and the second clutch C2 is put in the release state.

The operations of the first clutch C1, the second clutch C2, the first brake B1, and the second brake B2 are controlled by the vehicle control device 30. The vehicle control device 30 controls the clutches C1, C2 and the brakes B1, B2 based on the accelerator opening and the vehicle speed, and thus, appropriately switches the shift gear stage.

Figure 19:
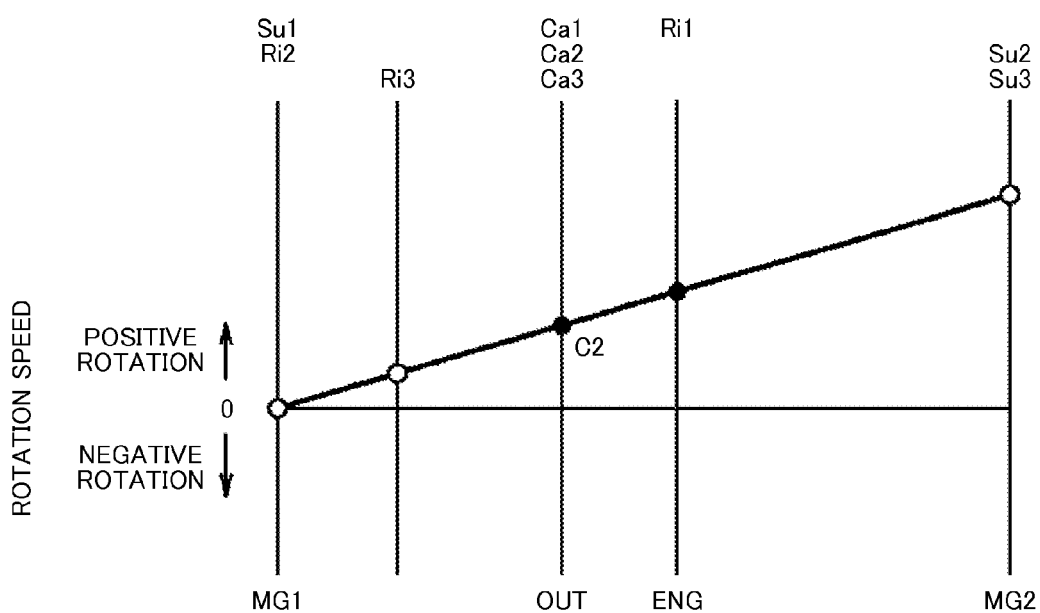
FIG. 19 is a diagram showing an example of an alignment chart of a transmission at the time of acceleration travel when the transmission is a third gear speed.
Figure 20:
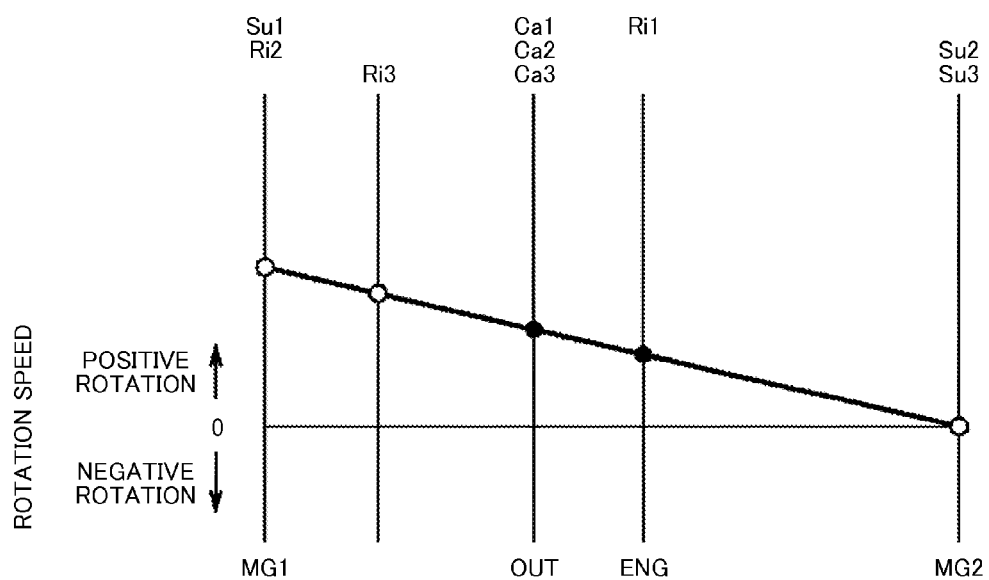
FIG. 20 is a diagram showing an example of an alignment chart of a transmission at the time of acceleration travel when the transmission is a fourth gear speed.

In the vehicle 1B, the steady travel mode and the acceleration/deceleration travel mode are also provided as the travel modes. The vehicle control device 30 executes the acceleration/deceleration travel mode when the high-speed steady travel condition is established. However, in this embodiment, when executing the acceleration/deceleration travel mode, the transmission 40 is switched to the Hi mode. Switching to the third gear speed or the fourth gear speed in the Hi mode is determined according to the requested speed or the like. For example, when the requested speed is less than a predetermined threshold value, switching to the third gear speed may be performed, and when the requested speed is equal to or greater than the threshold value, switching to the fourth gear speed may be performed. In the case of the third gear speed, the engine 11 is controlled such that the rotation speed of the first MG 12 becomes zero at the time of acceleration travel. FIG. 19 shows an alignment chart of the transmission 40 at the time of acceleration travel when the transmission 40 is the third gear speed. On the other hand, in the case of the fourth gear speed, the engine 11 is controlled such that the rotation speed of the second MG 13 becomes zero at the time of acceleration travel. FIG. 20 shows an alignment chart of the transmission 40 at the time of acceleration travel when the transmission 40 is the fourth gear speed.

Figure 21:
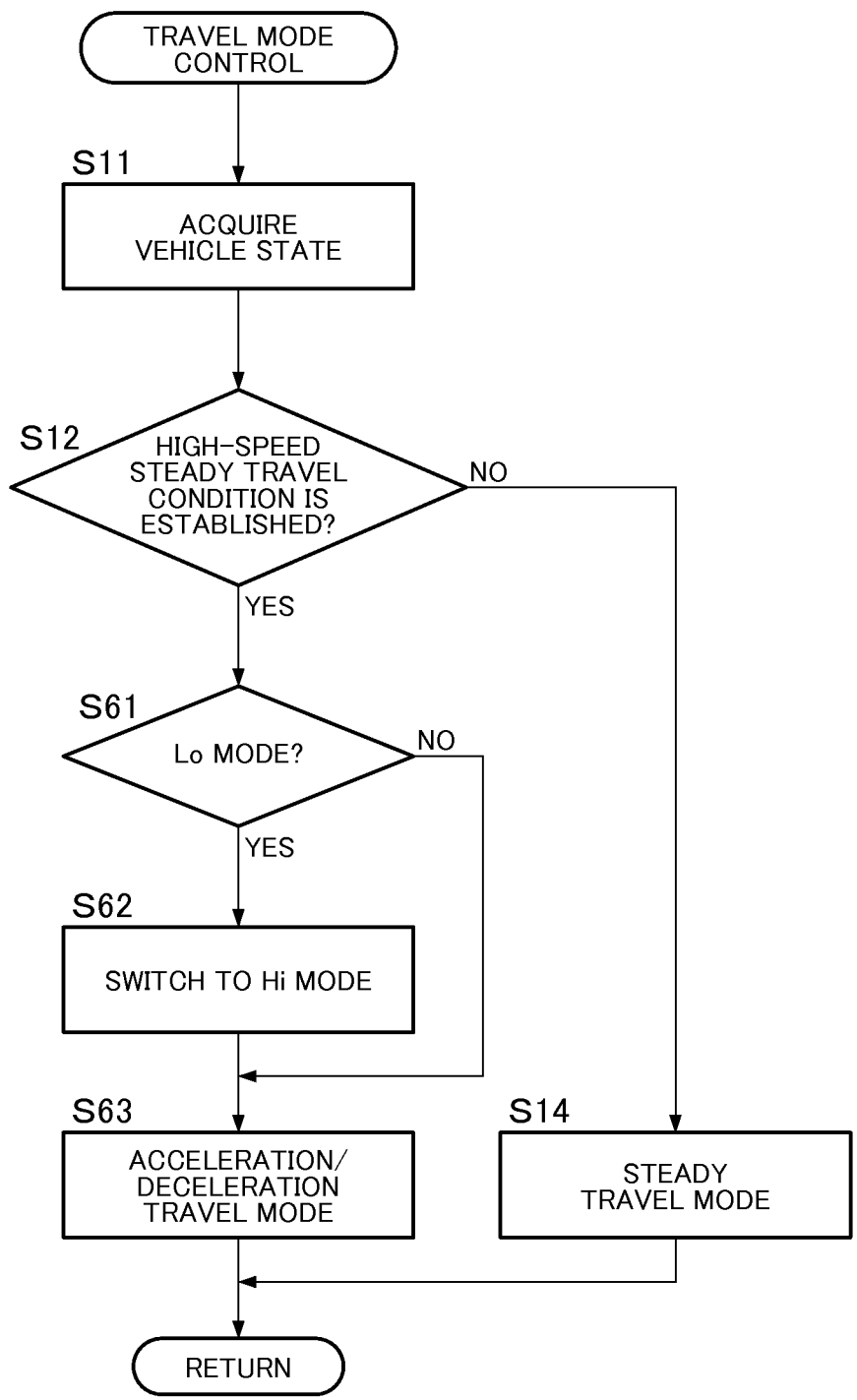
FIG. 21 is a flowchart showing a travel mode control routine which is executed by a vehicle control device in the travel control device according to the sixth embodiment.

FIG. 21 shows a travel mode control routine which is executed by the vehicle control device 30 in this embodiment. In the drawing, the portions common to the control routines of the above-described embodiments are represented by the same reference numerals, and description thereof will not be repeated.

In this control routine, the vehicle control device 30 advances processing to Step S12 similarly to the control routine of FIG. 4. In Step S12, when it is determined that the high-speed steady travel condition is established, the process progresses to Step S61, and the vehicle control device 30 determines whether or not the transmission 40 is in the Lo mode, that is, the first gear speed or the second gear speed. When it is determined that the transmission 40 is in the Hi mode, the vehicle control device 30 skips Step S62 and progresses to Step S63. On the other hand, when it is determined that the transmission 40 is in the Lo mode, the process progresses to Step S62, and the vehicle control device 30 switches the transmission 40 to the Hi mode. As described above, switching to the third gear speed or the fourth gear speed in the Hi mode may be appropriately determined according to the requested speed or the like.

Next, in Step S63, the vehicle control device 30 switches the travel mode to the acceleration/deceleration travel mode. At this time, as described above, when the transmission 40 is the third gear speed, the engine 11 is controlled such that the rotation speed of the first MG 12 becomes zero at the time of acceleration travel. On the other hand, when the transmission 40 is the fourth gear speed, the engine 11 is controlled such that the rotation speed of the second MG 13 becomes zero at the time of acceleration travel. Thereafter, this control routine ends.

As described above, in the sixth embodiment, when switching to the acceleration/deceleration travel mode, the transmission 40 is switched to the Hi mode; thus, the transmission gear ratio in the transmission 40 can be made smaller compared to the Lo mode. For this reason, drive force necessary for allowing acceleration travel of the vehicle 1B becomes small. With this, since it is possible to reduce energy consumed at the time of acceleration travel, it is possible to improve the total energy efficiency of the vehicle 1B. Furthermore, it is thus possible to improve fuel efficiency.

The Lo mode of this embodiment corresponds to a low-speed mode of the invention, and the Hi mode corresponds to a high-speed mode of the invention. The first planetary gear mechanism 41 corresponds to a planetary gear mechanism of the invention. The second planetary gear mechanism 42 corresponds to a first planetary gear mechanism for transmission of the invention. The third planetary gear mechanism 43 corresponds to a second planetary gear mechanism for transmission of the invention.

The invention is not limited to the respective embodiments described above, and can be carried out in various forms. For example, the respective forms described above may be appropriately combined within a range so as not to interfere with each other. For example, the second embodiment, the third embodiment, the fourth embodiment, and the fifth embodiment may be combined.

The invention claimed is:

1. A travel control device for a hybrid vehicle, the hybrid vehicle including
   an internal combustion engine,
   a first motor generator,
   an output part configured to transmit power to a driving wheel,
   a differential mechanism including a first rotary element, a second rotary element, and a third rotary element, the first rotary element, the second rotary element, and the third rotary element being configured to mutually perform differential rotation, the first rotary element being connected to the internal combustion engine, the second rotary element being connected to the first motor generator, and the third rotary element being connected to the output part, and
   a second motor generator configured to output power to the output part, the travel control device comprising:
   an electronic control unit configured to
   i) when a predetermined acceleration-deceleration travel condition is established during travel of the vehicle, a) set a target vehicle speed range based on a requested speed requested for the vehicle, and b) control the internal combustion engine, the first motor generator, and the second motor generator such that the vehicle travels in an acceleration-deceleration travel mode, the acceleration-deceleration travel mode being a travel mode in which acceleration travel and coasting travel are alternately and repeatedly performed within the target vehicle speed range, the acceleration travel being a travel in which the vehicle is accelerated with power from the internal combustion engine by putting the internal combustion engine in an operation state, and the coasting travel being a travel in which the vehicle coasts by putting the internal combustion engine in a stop state, and ii) control an operation of the internal combustion engine such that at a time of the acceleration travel, the vehicle is accelerated at an acceleration at which given power is output from the internal combustion engine and a rotation speed of either the first motor generator or the second motor generator becomes zero.

2. The travel control device according to claim 1, wherein the electronic control unit is configured to control an operation of the second motor generator such that, when the requested speed is higher than a predetermined upper limit speed set in advance, deceleration at a time of the coasting travel is equal to or lower than a predetermined allowable deceleration.

3. The travel control device according to claim 2, wherein the first motor generator and the second motor generator are electrically connected to a battery, the electronic control unit is configured to, when an operation of the second motor generator is controlled such that deceleration at a time of the coasting travel is equal to or lower than the allowable deceleration cause the first motor generator to function as a generator and drive the first motor generator with the internal combustion engine to charge the battery at a time of the acceleration travel.

4. The travel control device according to claim 1, wherein the electronic control unit is configured to
i) calculate an energy efficiency of the vehicle in a case where the vehicle is caused to travel in the acceleration-deceleration travel mode and an energy efficiency of the vehicle in a case where the vehicle is caused to travel in a steady travel mode in which the vehicle is caused to travel at a constant speed, and
ii) when the acceleration-deceleration travel condition is established and the energy efficiency of the vehicle in a case where the vehicle is caused to travel in the acceleration-deceleration travel mode is greater than the energy efficiency of the vehicle in a case where the vehicle is caused to travel in the steady travel mode, control the internal combustion engine, the first motor generator, and the second motor generator such that the vehicle travels in the acceleration-deceleration travel mode.

5. The travel control device according to claim 1, wherein when the requested speed is higher than a predetermined determination speed set in advance, the electronic control unit is configured to control the internal combustion engine, the first motor generator, and the second motor generator such that the vehicle travels in a steady travel mode in which the vehicle is caused to travel at a constant speed even though the acceleration-deceleration travel condition is established.

6. The travel control device according to claim 1, wherein the vehicle is provided with a transmission, the transmission including a first single-pinion planetary gear mechanism provided as the differential mechanism, a second single-pinion planetary gear mechanism for transmission, and a third single-pinion planetary gear mechanism for transmission, a ring gear of the first single-pinion planetary gear mechanism is connected to an output shaft of the internal combustion engine, a sun gear of the first single-pinion planetary gear mechanism and a ring gear of the second single-pinion planetary gear mechanism are connected to a rotor of the first motor generator, a carrier of the first single-pinion planetary gear mechanism and a carrier of the second single-pinion planetary gear mechanism are connected through a rotary member, a sun gear of the second single-pinion planetary gear mechanism, a sun gear of the third single-pinion planetary gear mechanism, and a rotor of the second motor generator are connected through a coupling member, a carrier of the third single-pinion planetary gear mechanism is connected to an output member which outputs power to the driving wheel, a ring gear of the third single-pinion planetary gear mechanism is provided with a first brake capable of braking the ring gear of the third single-pinion planetary gear mechanism, the coupling member is provided with a second brake capable of braking the coupling member, the carrier of the second single-pinion planetary gear mechanism and the coupling member are connected through a first clutch which is switchable between an engagement state where the carrier of the second single-pinion planetary gear mechanism and the coupling member are coupled to rotate integrally and a release state where the carrier of the second single-pinion planetary gear mechanism and the coupling member are released, the rotary member and the output member are connected through a second clutch which is switchable between an engagement state where the rotary member and the output member are coupled to rotate integrally and a release state where the rotary member and the output member are released, the transmission is able to switch a mode between a low-speed mode and a high-speed mode, the low-speed mode is a mode in which the ring gear of the third single-pinion planetary gear mechanism is braked by the first brakes and the second clutch is switched to the release state, the high-speed mode is a mode in which the braking of the ring gear of the third single-pinion planetary gear mechanism by the first brake is released and the second clutch is switched to the engagement state, the electronic control unit is configured to switch the transmission to the high-speed mode when the acceleration-deceleration travel condition is established, and the electronic control unit is configured to control the internal combustion engine, the first motor generator, and the second motor generator such that the vehicle travels in the acceleration-deceleration travel mode after the transmission is switched to the high-speed mode.

* * * * *